(12) United States Patent
Mitchell

(10) Patent No.: US 12,238,051 B2
(45) Date of Patent: *Feb. 25, 2025

(54) SYNCHRONOUS INTERFACING WITH UNAFFILIATED NETWORKED SYSTEMS TO ALTER FUNCTIONALITY OF SETS OF ELECTRONIC ASSETS

(71) Applicant: Wells Fargo Bank, N.A., San Francisco, CA (US)

(72) Inventor: Joshua R. Mitchell, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,338

(22) Filed: Apr. 1, 2024

(65) Prior Publication Data

US 2024/0273303 A1 Aug. 15, 2024

Related U.S. Application Data

(63) Continuation of application No. 18/126,886, filed on Mar. 27, 2023, now Pat. No. 11,947,918, which is a
(Continued)

(51) Int. Cl.
*H04L 51/02* (2022.01)
*G06F 40/30* (2020.01)
(Continued)

(52) U.S. Cl.
CPC .............. *H04L 51/02* (2013.01); *G06F 40/30* (2020.01); *G06F 40/35* (2020.01); *G06K 7/143* (2013.01);
(Continued)

(58) Field of Classification Search
CPC ... H04L 51/02; H04L 67/306; H04L 63/1433; G06F 40/30; G06F 40/295;
(Continued)

(56) References Cited

U.S. PATENT DOCUMENTS 2,751,554 A 6/1956 Schlesinger et al.
5,485,510 A 1/1996 Colbert
(Continued)

FOREIGN PATENT DOCUMENTS

AU 2006335151 A1 7/2007
AU 2006227177 A1 10/2007
(Continued)

OTHER PUBLICATIONS

US 10,979,433 B2, 04/2021, Zhang (withdrawn)
(Continued)

*Primary Examiner* — Kyung H Shin
(74) *Attorney, Agent, or Firm* — Foley & Lardner LLP

(57) ABSTRACT

Systems and methods for managing a set of electronic assets from a single location are disclosed. The method includes providing a portal with a network security access control. The method includes determining that login credentials input to the access control are associated with a set of electronic assets corresponding to a plurality of third-party computing systems with application programming interface (API) gateways configured to accept API calls directed to changes in functionality of the electronic assets. The method includes presenting, via the portal, a virtual icon to identify a coordinated action with respect to the set of electronic assets and, in response to a selection of the virtual icon, executing a set of API calls that include an asset-specific API call to each third-party computing system in the plurality of third-party computing systems to implement the coordinated action on all electronic assets in the set of electronic assets.

20 Claims, 8 Drawing Sheets

Related U.S. Application Data continuation of application No. 17/558,469, filed on Dec. 21, 2021, now Pat. No. 11,615,253, which is a continuation of application No. 17/240,730, filed on Apr. 26, 2021, now Pat. No. 11,256,875, which is a continuation of application No. 17/013,193, filed on Sep. 4, 2020, now Pat. No. 10,992,606.

(51) Int. Cl.

| | | |
|---|---|---|
| *G06F 40/35* | (2020.01) | |
| *G06K 7/14* | (2006.01) | |
| *H04L 9/32* | (2006.01) | |
| *H04L 9/40* | (2022.01) | |
| *H04L 67/00* | (2022.01) | |
| *H04L 67/133* | (2022.01) | |
| *H04L 67/53* | (2022.01) | |
| *H04M 15/00* | (2006.01) | |
| *G06F 21/00* | (2013.01) | |
| *G06F 21/57* | (2013.01) | |
| *G06F 40/295* | (2020.01) | |
| *G06Q 20/36* | (2012.01) | |
| *G06Q 50/14* | (2012.01) | |
| *H04L 67/306* | (2022.01) | |
| *H04M 15/30* | (2006.01) | |
| *H04W 4/14* | (2009.01) | |
| *H04W 4/24* | (2018.01) | |

(52) U.S. Cl.
CPC .......... *G06K 7/1443* (2013.01); *H04L 9/3231* (2013.01); *H04L 63/102* (2013.01); *H04L 63/1433* (2013.01); *H04L 67/133* (2022.05); *H04L 67/34* (2013.01); *H04L 67/53* (2022.05); *H04M 15/8214* (2013.01); *G06F 21/00* (2013.01); *G06F 21/577* (2013.01); *G06F 40/295* (2020.01); *G06Q 20/3678* (2013.01); *G06Q 50/14* (2013.01); *H04L 67/306* (2013.01); *H04M 15/30* (2013.01); *H04M 15/41* (2013.01); *H04M 15/42* (2013.01); *H04M 15/44* (2013.01); *H04M 15/751* (2013.01); *H04M 15/755* (2013.01); *H04M 15/765* (2013.01); *H04M 15/7652* (2013.01); *H04M 15/8038* (2013.01); *H04M 15/8083* (2013.01); *H04M 15/8221* (2013.01); *H04W 4/14* (2013.01); *H04W 4/24* (2013.01)

(58) Field of Classification Search
CPC .. G06F 16/90332; G06F 40/35; G06F 21/577; G06F 21/00; H04M 15/755; H04M 15/8221; H04M 15/8083; H04M 15/8214; H04M 15/42; H04M 15/765; H04M 15/751; H04M 15/8038; H04M 15/7652; H04M 15/44; H04M 15/41; H04W 4/14; H04W 4/24

See application file for complete search history.

(56) References Cited

U.S. PATENT DOCUMENTS

| | | |
|---|---|---|
| 5,573,457 A | 11/1996 | Watts et al. |
| 5,737,423 A | 4/1998 | Manduley |
| 5,953,710 A | 9/1999 | Fleming |
| 5,999,978 A | 12/1999 | Angal et al. |
| 6,047,268 A | 4/2000 | Bartoli et al. |
| 6,105,006 A | 8/2000 | Davis et al. |
| 6,188,309 B1 | 2/2001 | Levine |
| 6,193,152 B1 | 2/2001 | Fernando et al. |
| 6,408,330 B1 | 6/2002 | Delahuerga |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |
| 6,845,906 B2 | 1/2005 | Royer et al. |
| 6,865,547 B1 | 3/2005 | Brake et al. |
| 6,879,965 B2 | 4/2005 | Fung et al. |
| 6,910,021 B2 | 6/2005 | Brown et al. |
| 6,931,382 B2 | 8/2005 | Laage et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,107,243 B1 | 9/2006 | Mcdonald et al. |
| 7,155,411 B1 | 12/2006 | Blinn et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,331,518 B2 | 2/2008 | Rable |
| 7,347,361 B2 | 3/2008 | Lovett |
| 7,359,880 B2 | 4/2008 | Abel et al. |
| 7,383,988 B2 | 6/2008 | Slonecker, Jr. |
| 7,383,998 B2 | 6/2008 | Parker et al. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,413,113 B1 | 8/2008 | Zhu |
| 7,451,395 B2 | 11/2008 | Brants et al. |
| 7,512,563 B2 | 3/2009 | Likourezos et al. |
| 7,552,088 B2 | 6/2009 | Malcolm |
| 7,571,142 B1 | 8/2009 | Flitcroft et al. |
| 7,587,365 B2 | 9/2009 | Malik et al. |
| 7,594,258 B2 | 9/2009 | Mao et al. |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,707,082 B1 | 4/2010 | Lapstun et al. |
| 7,712,655 B2 | 5/2010 | Wong |
| 7,740,170 B2 | 6/2010 | Singh et al. |
| 7,753,265 B2 | 7/2010 | Harris |
| 7,778,932 B2 | 8/2010 | Yan |
| 7,818,319 B2 | 10/2010 | Henkin et al. |
| 7,857,212 B1 | 12/2010 | Matthews |
| 7,873,573 B2 | 1/2011 | Realini |
| 7,930,228 B1 | 4/2011 | Hawkins et al. |
| 7,937,325 B2 | 5/2011 | Kumar et al. |
| 7,941,534 B2 | 5/2011 | De La Huerga |
| 7,949,572 B2 | 5/2011 | Perrochon et al. |
| 7,954,704 B1 | 6/2011 | Gephart et al. |
| 8,090,346 B2 | 1/2012 | Cai |
| 8,099,109 B2 | 1/2012 | Altman et al. |
| 8,127,982 B1 | 3/2012 | Casey et al. |
| 8,160,933 B2 | 4/2012 | Nguyen et al. |
| 8,175,938 B2 | 5/2012 | Olliphant et al. |
| 8,196,131 B1 | 6/2012 | Von Behren et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,280,786 B1 | 10/2012 | Weiss et al. |
| 8,280,788 B2 | 10/2012 | Perlman |
| 8,296,228 B1 | 10/2012 | Kloor |
| 8,297,502 B1 | 10/2012 | Mcghie et al. |
| 8,301,566 B2 | 10/2012 | Mears |
| 8,332,294 B1 | 12/2012 | Thearling |
| 8,359,531 B2 | 1/2013 | Grandison et al. |
| 8,360,952 B2 | 1/2013 | Wissman et al. |
| 8,364,556 B2 | 1/2013 | Nguyen et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 | 4/2013 | Huynh et al. |
| 8,473,394 B2 | 6/2013 | Marshall |
| 8,489,761 B2 | 7/2013 | Pope et al. |
| 8,489,894 B2 | 7/2013 | Comrie et al. |
| 8,543,506 B2 | 9/2013 | Grandcolas et al. |
| 8,589,335 B2 | 11/2013 | Smith et al. |

(56) References Cited

U.S. PATENT DOCUMENTS

| | | |
|---|---|---|
| 8,595,074 B2 | 11/2013 | Sharma et al. |
| 8,595,098 B2 | 11/2013 | Starai et al. |
| 8,625,838 B2 | 1/2014 | Song et al. |
| 8,630,952 B2 | 1/2014 | Menon |
| 8,635,687 B2 | 1/2014 | Binder |
| 8,639,629 B1 | 1/2014 | Hoffman |
| 8,655,310 B1 | 2/2014 | Katzer et al. |
| 8,655,719 B1 | 2/2014 | Li et al. |
| 8,660,926 B1 | 2/2014 | Wehunt et al. |
| 8,666,411 B2 | 3/2014 | Tokgoz et al. |
| 8,682,753 B2 | 3/2014 | Kulathungam |
| 8,682,802 B1 | 3/2014 | Kannanari |
| 8,700,729 B2 | 4/2014 | Dua |
| 8,706,625 B2 | 4/2014 | Vicente et al. |
| 8,712,839 B2 | 4/2014 | Steinert et al. |
| 8,725,601 B2 | 5/2014 | Ledbetter et al. |
| 8,762,211 B2 | 6/2014 | Killian et al. |
| 8,762,237 B2 | 6/2014 | Monasterio et al. |
| 8,768,838 B1 | 7/2014 | Hoffman |
| 8,781,882 B1 | 7/2014 | Arboletti et al. |
| 8,781,957 B2 | 7/2014 | Jackson et al. |
| 8,781,963 B1 | 7/2014 | Feng et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,868,458 B1 | 10/2014 | Starbuck et al. |
| 8,868,666 B1 | 10/2014 | Hellwege et al. |
| 8,880,047 B2 | 11/2014 | Konicek et al. |
| 8,887,997 B2 | 11/2014 | Barret et al. |
| 8,910,304 B2 | 12/2014 | Tsujimoto |
| 8,924,288 B1 | 12/2014 | Easley et al. |
| 8,925,099 B1 | 12/2014 | Saxe et al. |
| 8,954,839 B2 | 2/2015 | Sharma et al. |
| 9,043,609 B2 | 5/2015 | Calman |
| 9,076,134 B2 | 7/2015 | Grovit et al. |
| 9,105,021 B2 | 8/2015 | Tobin |
| 9,195,984 B1 | 11/2015 | Spector et al. |
| 9,256,871 B2 | 2/2016 | Anderson et al. |
| 9,256,904 B1 | 2/2016 | Haller et al. |
| 9,305,155 B1 | 4/2016 | Vo et al. |
| 9,351,193 B1 | 5/2016 | Raleigh et al. |
| 9,372,849 B2 | 6/2016 | Gluck et al. |
| 9,390,417 B2 | 7/2016 | Song et al. |
| 9,396,491 B2 | 7/2016 | Isaacson et al. |
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,524,525 B2 | 12/2016 | Manyam et al. |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,710,566 B2 | 7/2017 | Ainslie et al. |
| 9,740,543 B1 | 8/2017 | Savage et al. |
| 9,760,871 B1 | 9/2017 | Pourfallah et al. |
| 9,775,029 B2 | 9/2017 | Lopez |
| 9,792,636 B2 | 10/2017 | Milne |
| 9,792,648 B1 | 10/2017 | Haller et al. |
| 9,849,364 B2 | 12/2017 | Tran et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 9,996,837 B2 | 6/2018 | Siddens et al. |
| 10,032,146 B2 | 7/2018 | Caldwell |
| 10,044,501 B1 | 8/2018 | Bradley et al. |
| 10,044,647 B1 * | 8/2018 | Karp ................. H04L 51/02 |
| 10,050,779 B2 | 8/2018 | Alness et al. |
| 10,055,747 B1 | 8/2018 | Sherman et al. |
| 10,096,006 B2 | 10/2018 | Loevenguth et al. |
| 10,096,043 B2 | 10/2018 | Beck et al. |
| 10,097,356 B2 | 10/2018 | Zinder |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,282,741 B2 | 5/2019 | Yu et al. |
| 10,359,915 B2 | 7/2019 | Asai |
| 10,373,129 B1 | 8/2019 | James et al. |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,438,290 B1 | 10/2019 | Winklevoss et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 | 3/2020 | Viswanath et al. |
| 10,614,478 B1 | 4/2020 | Georgi |
| 10,650,448 B1 | 5/2020 | Haller et al. |
| 10,657,503 B1 | 5/2020 | Ebersole et al. |
| 10,673,862 B1 | 6/2020 | Threlkeld |
| 10,742,655 B2 | 8/2020 | Taylor et al. |
| 10,762,478 B1 | 9/2020 | Maeng |
| 10,867,298 B1 | 12/2020 | Duke et al. |
| 10,872,005 B1 | 12/2020 | Killis |
| 10,878,496 B1 | 12/2020 | Duong et al. |
| 10,936,711 B2 | 3/2021 | Jain et al. |
| 10,963,589 B1 | 3/2021 | Fakhraie et al. |
| 10,984,482 B1 | 4/2021 | Thangarajah et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 11,200,569 B1 | 12/2021 | James et al. |
| 11,227,064 B1 | 1/2022 | Fakhraie et al. |
| 11,386,223 B1 | 7/2022 | Fakhraie et al. |
| 11,507,935 B1 | 11/2022 | Ellis et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | Mcquaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | Mccarty |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0039041 A1 | 2/2005 | Shaw et al. |
| 2005/0060233 A1 | 3/2005 | Bonalle et al. |

(56) References Cited

U.S. PATENT DOCUMENTS

| | | |
|---|---|---|
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0211493 A1 | 9/2006 | Walker et al. |
| 2006/0235795 A1 | 10/2006 | Johnson et al. |
| 2006/0278698 A1 | 12/2006 | Lovett |
| 2007/0051797 A1 | 3/2007 | Randolph-Wall et al. |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0214030 A1 | 9/2007 | Shear et al. |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |
| 2009/0005269 A1 | 1/2009 | Martin et al. |
| 2009/0007231 A1 | 1/2009 | Kaiser et al. |
| 2009/0012898 A1 | 1/2009 | Sharma et al. |
| 2009/0055269 A1 | 2/2009 | Baron |
| 2009/0055642 A1 | 2/2009 | Myers et al. |
| 2009/0089113 A1 | 4/2009 | Rousso et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0292599 A1 | 11/2009 | Rampell et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |
| 2010/0276484 A1 | 11/2010 | Banerjee et al. |
| 2010/0312700 A1 | 12/2010 | Coulter et al. |
| 2010/0327056 A1 | 12/2010 | Yoshikawa et al. |
| 2011/0023129 A1 | 1/2011 | Vernal et al. |
| 2011/0035288 A1 | 2/2011 | Clyne |
| 2011/0035318 A1 | 2/2011 | Hargrove et al. |
| 2011/0035596 A1 | 2/2011 | Attia et al. |
| 2011/0078010 A1 | 3/2011 | Postrel |
| 2011/0106698 A1 | 5/2011 | Isaacson et al. |
| 2011/0162057 A1 | 6/2011 | Gottumukkala et al. |
| 2011/0172837 A1 | 7/2011 | Forbes, Jr. |
| 2011/0176010 A1 | 7/2011 | Houjou et al. |
| 2011/0178929 A1 | 7/2011 | Durkin et al. |
| 2011/0191177 A1 | 8/2011 | Blackhurst et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030006 A1 | 2/2012 | Yoder et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0095819 A1 | 4/2012 | Li |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0117467 A1 | 5/2012 | Maloney et al. |
| 2012/0117476 A1 | 5/2012 | Siegrist et al. |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0233013 A1 | 9/2012 | Smith |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1* | 9/2012 | Moore ................ H04L 63/1433 726/25 |
| 2012/0246122 A1 | 9/2012 | Short et al. |
| 2012/0253852 A1 | 10/2012 | Pourfallah et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1 | 1/2013 | Hammad et al. |
| 2013/0031006 A1 | 1/2013 | Mccullagh et al. |
| 2013/0046607 A1 | 2/2013 | Granville, III |
| 2013/0046690 A1 | 2/2013 | Calman et al. |
| 2013/0055378 A1 | 2/2013 | Chang et al. |
| 2013/0073388 A1 | 3/2013 | Heath |
| 2013/0080219 A1 | 3/2013 | Royyuru et al. |
| 2013/0090998 A1 | 4/2013 | Shimogori |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0159178 A1 | 6/2013 | Colon et al. |
| 2013/0166332 A1 | 6/2013 | Hammad |
| 2013/0173402 A1 | 7/2013 | Young et al. |

(56) References Cited

U.S. PATENT DOCUMENTS

| | | |
|---|---|---|
| 2013/0174244 A1 | 7/2013 | Taveau et al. |
| 2013/0191213 A1 | 7/2013 | Beck et al. |
| 2013/0204894 A1 | 8/2013 | Faith |
| 2013/0212666 A1 | 8/2013 | Mattsson et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0297400 A1 | 11/2013 | Nagarajan et al. |
| 2013/0301392 A1 | 11/2013 | Zhao |
| 2013/0317893 A1 | 11/2013 | Nelson et al. |
| 2013/0332256 A1 | 12/2013 | Faith et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0024354 A1 | 1/2014 | Haik et al. |
| 2014/0026193 A1 | 1/2014 | Saxman et al. |
| 2014/0032410 A1 | 1/2014 | Georgiev et al. |
| 2014/0032419 A1 | 1/2014 | Anderson et al. |
| 2014/0032723 A1 | 1/2014 | Nema |
| 2014/0040134 A1 | 2/2014 | Ciurea |
| 2014/0040144 A1 | 2/2014 | Plomske et al. |
| 2014/0046827 A1 | 2/2014 | Hochstatter et al. |
| 2014/0053069 A1 | 2/2014 | Yan |
| 2014/0058912 A1 | 2/2014 | Bajaj |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108140 A1 | 4/2014 | Crawford |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0136419 A1 | 5/2014 | Kiyohara |
| 2014/0143886 A1 | 5/2014 | Eversoll et al. |
| 2014/0149198 A1 | 5/2014 | Kim et al. |
| 2014/0149293 A1 | 5/2014 | Laracey |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |
| 2014/0236792 A1 | 8/2014 | Pant et al. |
| 2014/0237236 A1 | 8/2014 | Kalinichenko et al. |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258109 A1 | 9/2014 | Jiang et al. |
| 2014/0258110 A1 | 9/2014 | Davis et al. |
| 2014/0278538 A1 | 9/2014 | Smith et al. |
| 2014/0279309 A1 | 9/2014 | Cowen et al. |
| 2014/0279474 A1 | 9/2014 | Evans et al. |
| 2014/0279551 A1 | 9/2014 | Samid |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0337215 A1 | 11/2014 | Howe |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0039496 A1 | 2/2015 | Shuster |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0070132 A1 | 3/2015 | Candelore |
| 2015/0073989 A1 | 3/2015 | Green et al. |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0095999 A1 | 4/2015 | Toth |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0161643 A1 | 6/2015 | Randell et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220917 A1 | 8/2015 | Aabye et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |

(56) References Cited

U.S. PATENT DOCUMENTS

| | | |
|---|---|---|
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1 | 12/2015 | Brill et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1 | 3/2016 | Kurapati |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0132918 A1 | 5/2016 | Thomas |
| 2016/0140221 A1 | 5/2016 | Park et al. |
| 2016/0140541 A1 | 5/2016 | Pearson et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321643 A1 | 11/2016 | Beck et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0004590 A1 | 1/2017 | Gluhovsky |
| 2017/0011215 A1 | 1/2017 | Poiesz et al. |
| 2017/0011389 A1 | 1/2017 | Mccandless et al. |
| 2017/0011450 A1 | 1/2017 | Frager et al. |
| 2017/0018029 A1 | 1/2017 | Eiriz et al. |
| 2017/0024393 A1 | 1/2017 | Choksi et al. |
| 2017/0046679 A1 | 2/2017 | Gotlieb et al. |
| 2017/0068954 A1 | 3/2017 | Hockey et al. |
| 2017/0070484 A1 | 3/2017 | Kruse et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0161973 A1 | 6/2017 | Katta et al. |
| 2017/0237554 A1 | 8/2017 | Jacobs et al. |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2017/0366348 A1 | 12/2017 | Weimer |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0075440 A1 | 3/2018 | Beck et al. |
| 2018/0088909 A1 | 3/2018 | Baratta et al. |
| 2018/0096752 A1 | 4/2018 | Ovalle |
| 2018/0121913 A1 | 5/2018 | Unnerstall et al. |
| 2018/0158137 A1 | 6/2018 | Tsantes et al. |
| 2018/0174148 A1 | 6/2018 | Selvarajan |
| 2018/0247302 A1 | 8/2018 | Armstrong et al. |
| 2018/0254898 A1 | 9/2018 | Sprague et al. |
| 2018/0268382 A1 | 9/2018 | Wasserman |
| 2018/0268408 A1 | 9/2018 | Botros et al. |
| 2018/0270363 A1* | 9/2018 | Guday ............... H04M 15/8083 |
| 2018/0276628 A1 | 9/2018 | Radiotis et al. |
| 2018/0293554 A1 | 10/2018 | Johnson |
| 2018/0331835 A1 | 11/2018 | Jackson |
| 2018/0349922 A1 | 12/2018 | Carlson et al. |
| 2018/0357440 A1 | 12/2018 | Brady et al. |
| 2018/0365753 A1 | 12/2018 | Fredrich et al. |
| 2018/0373891 A1 | 12/2018 | Barday et al. |
| 2019/0007381 A1 | 1/2019 | Isaacson et al. |
| 2019/0095898 A1 | 3/2019 | Bhatia |
| 2019/0164221 A1 | 5/2019 | Hill et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0244214 A1 | 8/2019 | Flores et al. |
| 2019/0295069 A1 | 9/2019 | Pala et al. |
| 2019/0318122 A1 | 10/2019 | Hockey et al. |
| 2019/0318424 A1 | 10/2019 | Mcwilliams |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0378182 A1 | 12/2019 | Weinflash et al. |
| 2019/0392443 A1 | 12/2019 | Piparsaniya et al. |
| 2020/0005283 A1 | 1/2020 | Zimmerman et al. |
| 2020/0005347 A1 | 1/2020 | Boal |
| 2020/0074552 A1 | 3/2020 | Shier et al. |
| 2020/0076601 A1 | 3/2020 | Jafari |
| 2020/0090179 A1 | 3/2020 | Song et al. |
| 2020/0118114 A1 | 4/2020 | Benkreira et al. |
| 2020/0118132 A1 | 4/2020 | Schmidt et al. |
| 2020/0118133 A1 | 4/2020 | Schmidt et al. |
| 2020/0286057 A1 | 9/2020 | Desai |
| 2020/0286076 A1 | 9/2020 | Zhu et al. |
| 2020/0380514 A1 | 12/2020 | Crofts |
| 2021/0012326 A1 | 1/2021 | Maxwell Zelocchi |
| 2021/0027300 A1 | 1/2021 | Chetia et al. |
| 2021/0035072 A1 | 2/2021 | Awasthi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2021/0303335 A1 | 9/2021 | Foreman et al. |
| 2021/0350343 A1 | 11/2021 | Gaur et al. |
| 2021/0350458 A1 | 11/2021 | Gaur et al. |
| 2022/0029815 A1 | 1/2022 | Basu et al. |
| 2022/0292496 A1 | 9/2022 | Yan |
| 2022/0294630 A1 | 9/2022 | Collen |
| 2023/0036439 A1 | 2/2023 | Olson et al. |
| 2023/0070625 A1 | 3/2023 | Gaur et al. |

(56) References Cited

U.S. PATENT DOCUMENTS

| | | |
|---|---|---|
| 2023/0206329 A1 | 6/2023 | Cella et al. |
| 2023/0214925 A1 | 7/2023 | Cella et al. |
| 2024/0265405 A1 | 8/2024 | Kramme et al. |

FOREIGN PATENT DOCUMENTS

| | | |
|---|---|---|
| AU | 2011268420 A1 | 12/2012 |
| AU | 2015255170 A1 | 11/2015 |
| AU | 2016285320 A1 | 1/2017 |
| CA | 2369296 A1 | 10/2000 |
| CA | 2600101 A1 | 2/2008 |
| CA | 2751554 A1 | 8/2010 |
| CA | 2736690 A1 | 10/2011 |
| CA | 3014995 C | 8/2017 |
| CN | 1353842 A | 6/2002 |
| CN | 101303717 A | 11/2008 |
| CN | 102346896 A | 2/2012 |
| CN | 102498497 A | 6/2012 |
| CN | 102804219 A | 11/2012 |
| CN | 103635920 A | 3/2014 |
| CN | 103797500 A | 5/2014 |
| CN | 103843024 A | 6/2014 |
| CN | 104106276 B | 10/2014 |
| CN | 102648476 B | 3/2016 |
| CN | 107230049 A | 10/2017 |
| CN | 107230070 A | 10/2017 |
| CN | 103413231 B | 11/2017 |
| EP | 1 259 947 A2 | 11/2002 |
| EP | 1 770 628 A2 | 4/2007 |
| EP | 3 073 670 B1 | 9/2016 |
| GB | 0 441 156 A | 1/1936 |
| GB | 2 441 156 A | 2/2008 |
| KR | 20160015375 A | 2/2016 |
| WO | WO-90/13096 A1 | 11/1990 |
| WO | WO-00/72245 A1 | 11/2000 |
| WO | WO-03/038551 A2 | 5/2003 |
| WO | WO-2004/081893 A1 | 9/2004 |
| WO | WO-2004/090825 A1 | 10/2004 |
| WO | WO-2005/116886 A2 | 12/2005 |
| WO | WO-2009/151839 A1 | 12/2009 |
| WO | WO-2011/017613 A2 | 2/2011 |
| WO | WO-2011/053404 A1 | 5/2011 |
| WO | WO-2012/054148 A1 | 4/2012 |
| WO | WO-2012/150602 A1 | 11/2012 |
| WO | WO-2013/044175 A1 | 3/2013 |
| WO | WO-2013/075071 A1 | 5/2013 |
| WO | WO-2013/082190 A1 | 6/2013 |
| WO | WO-2015/036817 A1 | 3/2015 |
| WO | WO-2015/103443 A1 | 7/2015 |
| WO | WO-2015/135131 A1 | 9/2015 |
| WO | WO-2016/015054 A1 | 1/2016 |
| WO | WO-2016/025291 A1 | 2/2016 |
| WO | WO-2017/035399 A1 | 3/2017 |
| WO | WO-2018/005635 A1 | 1/2018 |
| WO | WO-2022/154789 A1 | 7/2022 |

OTHER PUBLICATIONS

Tene et al. Big Data for All: Privacy and User Control in the Age of Analytics. Northwestern Journal of technology and Intellectual Property. https://scholarlycommons.law.northwestern.edu/cgi/viewcontent.cgi?article= 1191 &context=njtip (Year: 2013).

Luz et al: "A Mobile NFC Payment Terminal for the Event-Wallet on an Android Smartphone" researchgat.net, (Year: 2012).

"Bitcoin Off-Chain Transactions: Their Invention and Use," by Michelle Mount. Geo. L. Tech. Rev. 4. 2020. pp. 685-698. (Year:2020).

"The Bitcoin Lightening Network: Scalable Off-Chain Instant Payments," by Joseph Poon; and Thaddeus Dryia. Jan. 14, 2016. (Year: 2016).

Are Central Bank Digital Currencies (CBDCs) the money of tomorrow (Year: 2020).

ASB, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize. Net. Authorize.Net Mobile Application: iOS User Guide. Sep. 2015. Authorize. Net LLC. Ver.2.0, 1-23. https://www.authorize.net/content/dam/anet-redesign/documents/iosuserguide.pdf (Year: 2015).

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Co-Op Think, Rachna Ahlawat at Co-Op Think—Evolution Sessions from THINK14, Dec. 22, 2014, 26:22. https://www.youtube.com/watch?v=yEp-qfZoPhl (Year: 2014).

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Demiriz et al. "Using Location Aware Business Rules for Preventing Retail Banking Frauds" Jan. 15, 2015, IEEE (Year: 2015).

Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).

Eickhoff et al: "Quality through Flow and Immersion: Gamifying Crowdsourced Relevance Assessments" , Proceedings of the 35th international ACM SIGIR conference on Research and development in information retrieval, Aug. 12, 2012. (Year: 2012).

Fiserv. CardValet: Mobile Application Training. Fiserv, Inc. 1-93. https://www.westernbanks.com/media/1664/ cardvalet-application .pdf (Year: 2015).

Foreign Action other than Search Report on non-Foley case related to US Dtd Dec. 7, 2022.

Fort Knox Federal Credit Union, "Lost or Stolen VISA Card", http://www.fortknoxfcu.org/loststolen.html, Feb. 1, 2001. 2 pages.

Hinze et al.; Event-Based Applications and Enabling Technologies. https://www.researchgate.net/profile/Annika-Hinze/publication/220796268_Event-based_applications_and_enabling_technologies/Links/Ofcfd 50b638d9592a1000000/Event-based-applications-and-enabling-technologies.pdf (Year: 2009).

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

IP.com Search Query; May 5, 2020 (Year: 2020).

Konsko: "Credit Card Tokenization: Here's What You Need to Know", Credit Card Basics, Credit Card-Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

Microsoft, "Automatically summarize a document", 2016. 3 pages.

Notre Dame FCU "Irish Card Shield: How to Control Transaction Types" Jan. 15, 2016, 0:27, https://youtube.com/watch?v=0eZG1c6Bn38 (Year: 2016).

NPL Search Terms (Year: 2024).

Other USPTO Comm. with Refs. on US Dtd Nov. 22, 2023.

PCM Credit Union, "CardValet Tutorial" Jun. 24, 2015, https://www.youtube.com/watch?v=uGPh9Htw0Wc (Year: 2015).

Purchasing charges ahead. (1994). Electronic Buyers' News,, 68. Retrieved from https://dialog.proquest.com/professional/docview/681599288?accountid=131444 on Nov. 13, 2020 (Year: 1994).

RBC Royal Bank, "If Your Card is Lost or Stolen", http://www.rblbank.com/pdfs/CreditCard/FAQs.pdf, Oct. 1, 2002. 2 pages.

Shehnaz Ahmed, Private partners could help RBI run a digital currency. (Year: 2021).

Shiravale, et al., Blockchain Technology: A Novel Approach in Information Security Research, IEEE 2018 (Year: 2018), 4 pps.

Smartphones as Practical and Secure Location Verification Tokens for Payments. file:///C:/Users/eoussir/Documents/e-Red% 20 Folder/

(56) References Cited

OTHER PUBLICATIONS

15496961 /N PL_ Smartphones %20as %20 Practical %20and %20Secu re %20 Location %20Verification %20Tokens %20for% 20Payments.pdf (Year: 2014).

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Technologies for Payment Fraud Prevention: EMV, Encryption, and Tokenization, Oct. 2014, Smart Card Alliance, pp. 1-34 (Year: 2014).

Transaction aggregation as a strategy for credit card fraud detection. file:///C:/Users/eoussir/Downloads/Transaction_aggregation_as_a_strategy for credit_c. pdf (Year: 2009).

Union Bank & Trust, "Report Lost or Stolen Card", http://www.ubt.com/security-fraud/report-lost-or-stolen-cards, Jul. 10, 2005. 13 pages.

Urein et al: "A breakthrough for prepaid payment: End to end token exchange and management using secure SSL channels created by EAP-TLS smart cards", 2011 International Conference on Collaboration Technologies and Systems (CTS) (Year: 2011).

Using location aware business rules for preventing retail banking frauds. https://ieeexplore.ieee.org/stamp/stamp.jsp?tp=&arnumber= 7351936 (Year: 2015).

Yang MH. Security enhanced EMV-based mobile payment protocol. Scientific World Journal. 2014.https://www.ncbi.nlm.nih.gov/ pmc/articles/PMC4181509/ (Year: 2014).

Yang, et al., Impact of Bitcoin's Distributed Structure on the Construction of the Central Bank's Digital Currency System IEEE, 2020 (Year: 2020), 4 pps.

Yang, Ming-Hour; Security Enhanced EMV-Based Mobile Payment Protocol. https://patents.google.com/scholar/ 15767854982483958498?q (Security Enhanced EMV-Based Mobile Payment Protocol)&patents= false&scholar&oq=Security Enhanced EMV-Based Mobile Payment Protocol (Year: 2014).

Demiriz et al., "Using location aware business rules for preventing retail banking frauds," 2015 First International Conference on Anti-Cybercrime (ICACC), pp. 1-6. https://ieeexplore.ieee.org/documenU7351936? source=IQplus.

Dunman et al., "A Novel and Successful Credit Card Fraud Detection System Implemented in a Turkish Bank," 2013 IEEE 13th International Conference on Data Mining Workshops, Dallas, TX, USA. Retrieved from https://ieeexplore.ieee.org/documenU6753916? source=IQplus.

Ivatury, G., Mobile Phone Banking and Low-Income Customers, 2006, Retrieved from https://www.cgap.org/sites/default/files/CGAP-Mobile-Phone-Banking-and-Low-Income-Customers-Evidence-from-South-Africa-Jan. 2006.pdf.

Park et al., "Leveraging Cellular Infrastructure to Improve Fraud Prevention," 2009 Annual Computer Security Applications Conference, Honolulu, HI, USA, https://ieeexplore.ieee.org/documenU5380689?source=IQplus.

Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.ieee.org/documenU7844992? source=IQplus.

"Location based bank card fraud prevention using push notification technology," 2015, IP.com No. IPCOM000244440D (8 pages).

Mampaey, M., "Secure remittance transaction to bankless consumers in a fragmented applications market," 2011, in Bell Labs Technical Journal, vol. 16, Issue 2, pp. 219-233.

Yang, MH., "Security enhanced EMV-based mobile payment protocol," 2014, Scientific World Journal, 19 Pages.

* cited by examiner

SYNCHRONOUS INTERFACING WITH UNAFFILIATED NETWORKED SYSTEMS TO ALTER FUNCTIONALITY OF SETS OF ELECTRONIC ASSETS

CROSS-REFERENCE TO RELATED APPLICATIONS

This application is a continuation of U.S. patent application Ser. No. 18/126,886 filed Mar. 27, 2023, which is a continuation of U.S. patent application Ser. No. 17/558,469 filed Dec. 21, 2021, which is a continuation of U.S. patent application Ser. No. 17/240,730 filed Apr. 26, 2021, which is a continuation of U.S. patent application Ser. No. 17/013,193 filed Sep. 4, 2020, each of which is incorporated herein by reference in its entirety.

TECHNICAL FIELD

Embodiments of the present disclosure relate to systems and methods for transforming functionality of sets of electronic assets via interface calls using corresponding sets of networked computing interfaces.

BACKGROUND

A person may carry—in a wallet, purse, bag, or other "carrier"—a collection of many different kinds of electronic "assets" (e.g., several credit and debit cards, remote access keys such as radio-frequency identification (RFID) cards, gift cards, fobs, and other identifications). In some instances, the assets are serviced by many different issuers (e.g., several unaffiliated banks, businesses, and organizations). If the person loses the carrier, he/she may wish to deactivate all the assets in that carrier while he/she looks for the carrier to avoid fraudulent or otherwise unauthorized use of the electronic assets. This is normally achieved by contacting each individual third-party issuer of the electronic assets, such as by using a website or application of each issuer or contacting each issuer by telephone. Additionally, each issuer may have its own process for preventing fraudulent use of the asset that is different from other issuers, making this a relatively slow and cumbersome process at a time when the person is already distraught from the loss of the carrier. Moreover, a person may not remember exactly what assets were in the particular carrier when it was lost, making the process even more frustrating.

SUMMARY

Various embodiments relate to a method that includes providing, by a processor of a computing system through a telecommunications network, to a remote user computing device that includes an input device configured to detect at least one of biometric data, alphanumeric entries, or icon selections, a portal with a network security access control. The method includes receiving, by the processor, via the network security access control of the portal, login credentials detected using the input device of the user computing device, and in response to receiving the login credentials, determining, by the processor, that the login credentials are associated with a set of electronic assets corresponding to a plurality of third-party computing systems with application programming interface (API) gateways, where each of the API gateways is configured to accept an API call directed to changes in functionality of the electronic assets. The method includes presenting, by the processor, via the portal, a virtual icon configured to be selectable using the input device to identify a coordinated action with respect to all electronic assets in the set of electronic assets. The method further includes accepting, by the processor, via the portal, selection of the virtual icon detected using the input device of the user computing device, and in response to accepting the selection via the portal, executing, by the processor, a set of API calls that include an asset-specific API call to each third-party computing system in the plurality of third-party computing systems to implement the coordinated action on all electronic assets in the set of electronic assets.

Various embodiments relate to a computing system having a processor and a memory storing executable code. The executable code causes the computing system, when executed, to (i) provide, via an internet connection, to a user computing device that includes an input device configured to detect at least one of biometric data, alphanumeric entries, or icon selections, a portal with a network security access control; (ii) receive, via the network security access control of the portal, login credentials detected using the input device of the user computing device; (iii) in response to receiving the login credentials, determine that the login credentials are associated with a set of electronic assets corresponding to a plurality of third-party computing systems with application programming interface (API) gateways configured to accept API calls directed to changes in functionality of the electronic assets, (iv) present, via the portal, a virtual icon configured to be selectable using the input device to identify a coordinated action with respect to all electronic assets in the set of electronic assets; (v) accept, via the portal, selection of the virtual icon detected using the input device of the user computing device; and (vi) in response to accepting the selection via the portal, execute a set of API calls including an asset-specific API call to each third-party computing system in the plurality of third-party computing systems to implement the coordinated action on each corresponding electronic asset in the set of electronic assets.

Various embodiments relate to a method that includes presenting, on a display of a mobile device, a graphical user interface (GUI), where the mobile device includes an input device configured to detect at least one of alphanumeric entries, icon selections, or image data. The method also includes receiving, by a processor from the input device, a plurality of asset definitions for a set of electronic assets, each asset definition including a third-party identifier that is indicative of a respective one of a plurality of third-party computing systems. The method also includes identifying, via the processor, the plurality of third-party computing systems based on the plurality of third-party identifiers, and presenting, by the display, via the GUI, a virtual icon configured to be selectable using the input device to identify a coordinated action with respect to all electronic assets in the set of electronic assets. The method further includes receiving, by the processor, selection of the virtual icon from the input device, and in response to the selection, transmitting, via a transceiver of the mobile device, the selection to a remote computing system to implement the coordinated action on each corresponding electronic asset in the set of electronic assets.

These and other features, together with the organization and manner of operation thereof, will become apparent from the following detailed description when taken in conjunction with the accompanying drawings.

DETAILED DESCRIPTION

Figure 1:
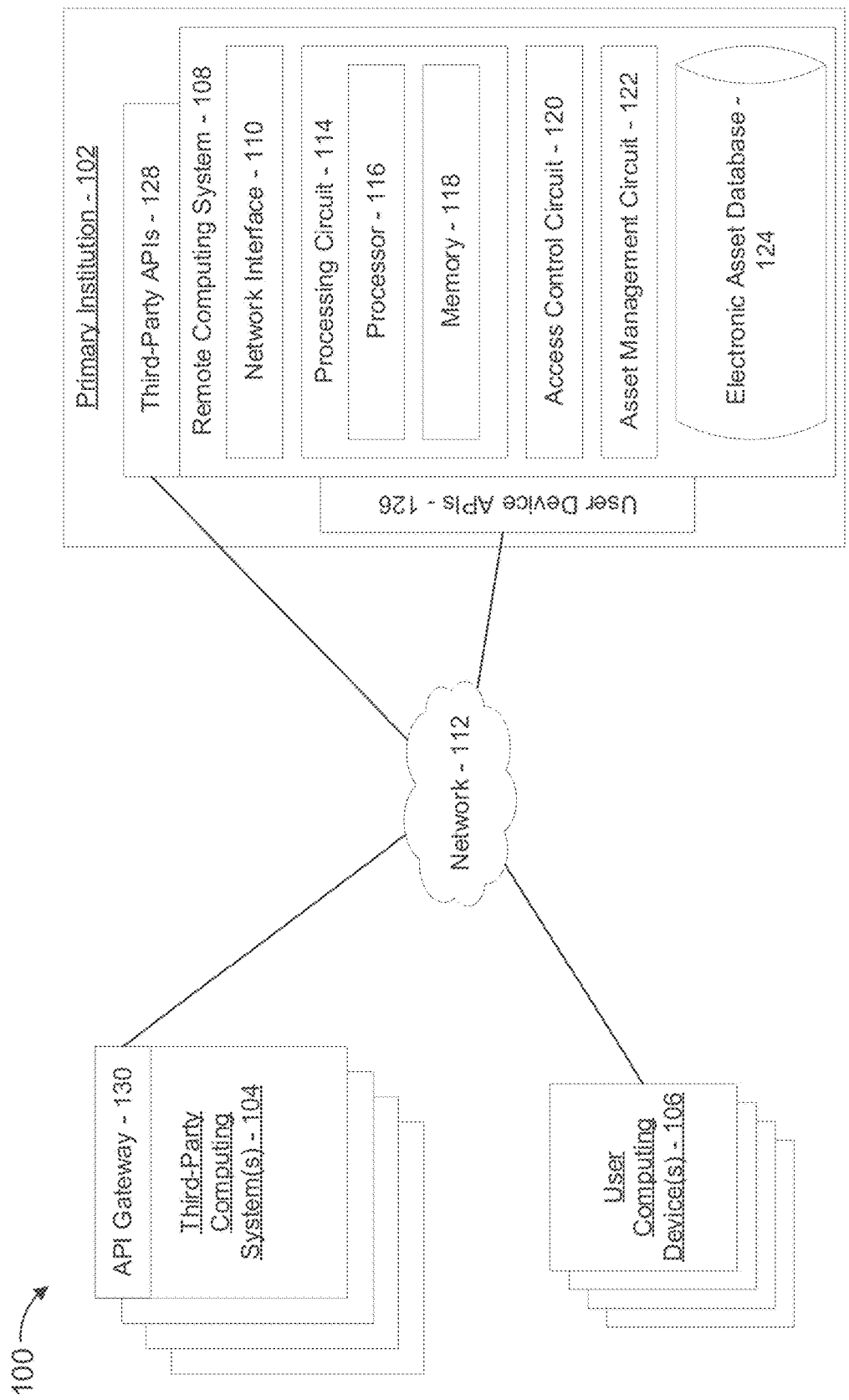
FIG. 1 is a block diagram of an electronic asset management system, according to an example embodiment.

Referring to the figures generally, systems, methods, and apparatuses for managing groupings of electronic assets synchronously and from a single location (e.g., a central location, portal, etc.) are described. In particular, systems, methods, and apparatuses for taking specific coordinated action across a grouping of assets consisting of assets that are independently managed through multiple unaffiliated networked systems are described.

Existing third-party issuers of electronic identification cards and other electronic assets, such as government entities and financial institutions (e.g., banks), require clients to connect with them directly when changes to the operating status of the asset is desired. For example, in a situation where a person loses their wallet or purse, the person may wish to freeze and/or cancel any electronic access or identification cards that were carried in the purse to prevent fraudulent transactions. This process requires the person to notify each individual third-party issuer to take the required action. If the wallet or purse is ultimately deemed permanently lost, the person may wish to receive replacement assets. In that case, the cumbersome process of notifying each individual issuer needs to be repeated (if the assets were previously deactivated), or started anew (if assets were not previously deactivated, making the cumbersome process unavoidable). This process may be further complicated by different security protocols or procedures used by the various, unaffiliated third-party issuers that are responsible for the electronic assets. If a person is away from home or traveling internationally, the process of connecting with each issuer may be logistically complicated by differing communications networks. While some third-party issuers offer services to cancel and/or freeze cards over the internet, none offer a secure and efficient system for synchronously controlling sets and/or groupings of electronic assets from multiple unaffiliated networked systems from a single location.

In other situations, a person may wish to engage in some activity that affects multiple electronic assets from different third-party issuers at the same time, such as travel. In these situations, the person may only want to impose restrictions on (e.g., deactivate or limit usability thereof), remove restrictions from (e.g., authorize international transactions), or otherwise alter the functionality of, a grouping of assets because of their travel plans.

Referring generally to the figures, a system for managing sets and/or groupings of electronic assets from multiple, unaffiliated third-party issuers is described. In particular, the system provides a selection tool that allows a user to alter the functionality of all of the assets within a single grouping synchronously (e.g., in parallel, simultaneously, at the same time, etc.). The electronic assets may be payment items such as credit cards, debit cards, gift cards, or non-payment items such as identification cards and electronic access keys. The assets may be grouped within the system based on how they are physically carried. For example, a single grouping of assets may be contained within the same physical carrier (e.g., purse, wallet, etc.). A first grouping of electronic assets may be a grouping of credit cards, debit cards, RFID cards, and other electronically managed identification cards that are contained within a person's wallet. A second grouping of electronic assets may a grouping of credit cards, gift cards, and other electronically managed identification cards that are contained within the person's money clip that is used separately from the wallet or purse (e.g., for different occasions, under different circumstances, etc.). The wallet and the money clip may include different groupings of credit cards, and/or identification cards. When the person is using their wallet, he/she can use the system to quickly deactivate, freeze, or otherwise restrict the use of the second grouping of electronic assets (in the money clip) to protect the assets when not in use, without having to engage with multiple third-party issuers. In the event that the wallet and/or money clip becomes lost, the person can use the system to identify which electronic assets are affected by the loss, and to deactivate, restrict, or otherwise alter all of the electronic assets within the first or second groupings at the same time (and with a single selection). Actions may be performed in a "single click" fashion to simplify control over multiple assets.

In one embodiment, the system uses a set of application programming interfaces (APIs) to communicate the desired changes in functionality to the different, unaffiliated third-party issuers. For example, each third-party issuer may be provided with its own API to allow it to implement different functions for the assets they support. Upon receiving a selection to modify the functionality of a grouping of assets, the system executes an asset-specific API call to each of the third-party computing systems to implement the desired change. Among other benefits, the use of multiple APIs allows the system to adapt to different policies that may be used between different third-party issuers (e.g., different policies for altering the functionality of electronic assets in the same way). Additionally, the use of multiple APIs that can be executed in parallel is more efficient that other methods of coordinated control.

The system is also configured to facilitate recognition and grouping of the electronic assets. For example, the system can be configured to scan each of the electronic assets (e.g., cards, etc.) using a sensor of a mobile device, and to automatically recognize and the third-party issuer that supports (e.g., manages, funds, etc.) the asset. In particular, in various embodiments, the system may be configured to convert image data that is obtained from the scan to machine readable text, and match the text with the API that corresponds to the asset. In certain embodiments, the sensor is a magnetic reader, or another form of integrated sensor/reader. In various embodiments, the system is configured to identify at least one electronic asset through wireless communications between the mobile device 200 and the electronic asset. Each API, electronic assets, mobile device, etc., may have a corresponding unique identifier (e.g., an API identifier, an asset identifier, a device identifier) that is generated or obtained by the system, and identifiers may be linked or paired so as to associate the identifiers and indicate that the corresponding API, asset, device, etc. correspond to each other. Among other benefits, the automated recognition and integration of electronic assets from different third-party issuers greatly reduces the time required to input different electronic assets into the system, and reduces the risk of pairing electronic assets with incorrect APIs.

In one embodiment, the system serves, provides, or otherwise includes a portal (e.g., an internet portal that is accessible via an internet browser, an application running on a mobile device, etc.) that is configured to maintain asset information, and to facilitate user control of groupings of electronic assets. The portal may include a network security access control to prevent fraudulent access to the groupings of assets. The portal may allow the user to take a set of actions, in batch, on a grouping of assets (e.g., turn off and replace all electronic assets grouped in "wallet"). The portal may also provide notifications from other third-party issuers, prompting the user to take any additional steps that are needed with individual third-party issuers to implement the requested actions. In one embodiment, the portal may automatically redirect the user to other applications (e.g., sponsored by one or more third-party issuers) to complete the requested actions.

In one embodiment, the portal may be implemented as part of the operating system of a user's mobile device to facilitate more rapid selection of the desired actions. For example, a selection tool may be integrated into a shortcuts screen or through interaction with an application icon that corresponds to the portal. For example, in order to select a certain action with respect to a grouping of electronic assets, the user may select and hold the application icon (e.g., on a touchscreen display) for a threshold period and/or make a selection from a shortcut menu that opens after pressing the application icon for the threshold period.

The system can also perform other more complex actions with respect to one or more groupings of electronic assets. For example, the portal may include a travel planner that allows the user to enter information on locations, dates, and other travel-related information to selectively control pre-defined groupings of assets (e.g., to identify a set of actions, pre-authorizations, or restrictions to be taken with respect to the pre-defined grouping of assets). In this way, a user can notify the third-party issuers about anticipated travel plans, to reduce the risk of the third-party issuers inadvertently locking/freezing funds or other electronic assets used due to use of the assets outside of the area where the user resides.

As used herein, the term "electronic asset" or "asset" refers to any form of user and/or user account identification that can be remotely activated, deactivated, restricted, or otherwise altered. For example, electronic assets may refer to payment items/vehicles such as payment cards (e.g., credit cards, charge cards, ATM cards, debit cards, stored-value cards such as gift cards, fleet cards, etc.), checks, and money orders. Additionally, electronic assets may refer to non-payment items such as electronic identification cards, security access devices (e.g., key cards, RFID access cards, etc.), and the like.

Referring to FIG. 1, a view of an electronic asset management system 100 is shown according to an example embodiment. As described below in further detail, the electronic asset management system 100 facilitates the sharing and management of groupings/sets of electronic assets associated with a user. The system 100 includes a primary institution 102, at least one third-party computing system 104, and at least one user computing device 106. The electronic asset information can include asset definitions that identify the asset (e.g., account numbers, labels/identifiers for third-party issuers, etc.), transaction and/or use history of the electronic asset (e.g., account balances, transaction information, bill due dates, etc.), and grouping definitions that include asset definitions for all electronics assets contained within a single carrier. The electronic asset information may also include user personal information stored by the primary institution 102 and/or used by the third-party computing systems 104 for security purposes (e.g., identity information, authentication information, etc.).

The user may be a customer or an account holder of the primary institution 102. The primary institution 102 includes a remote computing system 108. The remote computing system 108 maintains information about electronic assets held by the user and groupings of electronic assets. In one embodiment, the remote computing system 108 also maintains accounts held with the primary institution 102 and facilitates the movement of funds into and out of the accounts, or between the accounts in the primary institution 102 and other third-party issuers. For example, the primary institution 102 may be a financial institution that maintains at least one financial account of the user. Additionally, the remote computing system 108 facilitates the sharing of and the provision of access to information associated with user accounts to the user, to user computing devices 106, and to third-party computing systems 104. The remote computing system 108 includes a network interface 110. The network interface 110 is structured to facilitate data communication with other computing systems (e.g., the user computing devices 106, the third-party computing systems 104, etc.) via a network 112. The network interface 110 includes hardware and program logic that facilitates connection of the remote computing system 108 to the network 112. For example, the network interface 110 may include a wireless network transceiver (e.g., a cellular modem, a Bluetooth transceiver, a WiFi transceiver, etc.) and/or a wired network transceiver (e.g., an Ethernet transceiver). In some arrangements, the network interface 110 includes the hardware and programming logic sufficient to support communication over multiple channels of data communication (e.g., the Internet and an internal primary institution network). Further, in some arrangements, the network interface 110 is structured to encrypt data sent over the network 112 and decrypt received encrypted data.

The remote computing system 108 includes a processing circuit 114 having a processor 116 and memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 includes one or more memory devices (e.g., RAM, NVRAM, ROM, Flash Memory, hard disk storage, etc.) that store data and/or computer code for facilitating the various processes described herein. Moreover, the memory 118 may be or include tangible, non-transient volatile memory or non-volatile memory.

As shown in FIG. 1, the remote computing system 108 includes an access control circuit 120 and an electronic asset management circuit 122. Although shown as separate circuits in FIG. 1, in some arrangements, the access control circuit 120 and/or the electronic asset management circuit 122 are part of the processing circuit 114. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The access control circuit 120 is structured to manage the sharing and provision of customer information to third-party computing systems 104 and to user computing devices 106 based on permissions and preferences of the user. The electronic asset management circuit 122 is structured to perform various electronic asset management functions for groupings of electronic assets, including maintaining an electronic asset database 124, sharing electronic asset information between the user computing devices 106 and third-party computing systems 104, analyzing asset definitions, selecting third-party API calls based on asset definitions, and synchronously routing commands/selections from the user computing devices to the third-party computing systems 104 using the API calls.

The remote computing system 108 includes the electronic asset database 124. In some arrangements, the electronic asset database 124 is part of the memory 118. The electronic asset database 124 is structured to hold, store, categorize, and otherwise serve as a repository for electronic asset information, groupings of assets, user selections, and APIs. For example, the electronic asset database 124 may store asset definitions that identify the electronic assets such as account numbers, third-party identifiers that are indicative of a respective one of the plurality of third-party computing systems 104, grouping definitions including lists of electronic assets that are contained within different carriers, and the like. The electronic asset database 124 may also include information related to use of each grouping of electronic assets, or individual electronic assets within each grouping (e.g., account balances, use/transaction information, account ownership information, and the like). The electronic asset database 124 is structured to selectively provide access to information relating to groupings of electronic assets (e.g., to the user via the user computing devices 106). In some arrangements, the remote computing system 108 includes other databases, such as customer document and information databases structured to store non-asset related information or other documents associated with the user for distribution to third-party computing systems 104 at the approval of the user.

Still referring to FIG. 1, the electronic asset management system 100 includes at least one third-party computing system 104. The third-party computing system 104 may be unaffiliated with the remote computing system 108 and/or may have separate security protocols from the remote computing system 108. Additionally, in embodiments with multiple third-party computing systems 104, at least two of the third-party computing systems 104 are unaffiliated with one another. In other words, each third-party computing system 104 is affiliated with a separate (e.g., different, etc.) third-party issuer that maintains, sponsors, or otherwise services at least one electronic asset. As used herein, the term "unaffiliated" means that at least two recipient computing systems are those of separate unrelated entities and/or institutions that have separate security protocols. The third-party computing systems 104 are communicably coupled to the primary institution 102 through remote computing system 108 and can be authorized by the user to access information associated with the user that is stored, generated, maintained, and/or controlled in part by the primary institution 102. For example, the third-party computing systems 104 may be affiliated with any combination of merchants (e.g., brick-and-mortar retailers, e-commerce merchants, etc.), payment networks (e.g., payment networks affiliated with credit cards offered by the primary institution 102 and/or third-party issuers that are not affiliated with the primary institution 102), governments, businesses (e.g., employers), or the like. As described in further detail below, the user can submit requests to manage electronic assets that are affiliated with the third-party issuers through the remote computing system 108.

The user is associated with various user computing devices 106. The user computing devices 106 may include, for example, desktop computers or mobile devices such as smartphones, tablet computers, laptop computers, wearables (e.g., smart watches, smart glasses, fitness trackers, etc.), and/or internet of things ("IOT") devices (e.g., Amazon Echo®, smart appliances, etc.). The user computing devices 106 provide access to information associated with the user (e.g., information regarding groupings of assets, etc.) that is stored, generated, maintained, and/or controlled in part by the primary institution 102.

The devices of the system 100 communicate via the network 112. The network 112 may include any combination of the Internet and an internal private network (e.g., any combination of wired and/or wireless networks, telecommunications networks, etc.). Through data communication over the network 112, the remote computing system 108 can coordinate requests from the user computing devices 106 to the third-party issuers (e.g., third-party computing systems 104) to change the functionality of different groupings of electronic assets.

As shown in FIG. 1, the remote computing system 108 includes user device APIs 126 that define how the remote computing system 108 communicates electronic asset information with the user computing devices 106. The user device APIs facilitate the sharing of and access to the electronic asset information stored at the remote computing system 108 based on permissions and preferences provided by the user. The user device APIs also facilitate the transmission of commands/selections from the user computing devices 106 to the remote computing system 108 to control functionality of groupings of assets.

The remote computing system 108 also includes third-party APIs 128 that define how the remote computing system 108 shares electronic asset information with the third-party computing systems 104. The third-party APIs 128 may facilitate the sharing of and access to information related to one or more electronic assets within a grouping of electronic assets (e.g., electronic assets that are supported, serviced, or otherwise controlled by a third-party issuer that is associated with the third-party APIs 128). The third-party APIs also facilitate the transmission of commands/selections from the remote computing system 108 to the third-party computing systems 104 to synchronously control the functionality of groupings of assets. As used herein, the term "synchronously" refers to the substantially coordinated control of assets that are supported by multiple, unaffiliated third-party computing systems 104. For example, synchronous control may refer to the transmission of API calls to each of the third-party computing system in parallel (e.g., at the same time), or in a controlled sequence (e.g., not necessarily at the same time) to reduce the average time required to activate, deactivate, restrict, or otherwise manage each asset from the grouping of assets. In one embodiment, the third-party APIs 128 are specifically configured to transmit requests/commands/selections through third-party API gateways 130 of the third-party computing systems 104. For example, the primary institution 102 may have arrangements with third-party issuers, and may have APIs 128 that are specific to each issuer, and that conform to the specific procedural requirements that each issuer has for changing the functionality of electronic assets that are managed by the third-party issuer. API calls (requests, commands, selections from the remote computing system 108) are routed by the third-party API gateways 130. Each API may require APIs calls that follow specific protocols, such as what data (e.g., security or access tokens, identifiers, etc.) is required with the API call, formatting of data provided, encryption, etc. The third-party API gateways 130 are management tools that accept (e.g., receive, authenticate, verify, analyze, decipher, decrypt, etc.) all API calls from the remote computing system 108, aggregate the various services required to fulfill them, and take the appropriate action through the third-party computing systems 104. The APIs 128 may include encryption to ensure the secure transfer of information between the remote computing system 108 and the third-party computing systems 104.

The access control circuit 120 controls access to the electronic asset information by the user computing devices 106 via the user device APIs 126. The access control circuit 120 may form part of a network security access control that prevents unauthorized viewing of electronic asset information. In some arrangements, the remote computing system 108 provisions requested electronic asset information to a given user computing device 106 for local storage on the user computing device 106. For example, the remote computing system 108 can provision grouping definitions that indicate which assets are associated with which carriers (e.g., which credit cards, RFID cards, gift cards, etc. are contained within a user's purse or another carrier), asset definitions such as third-party issuer identifiers that are indicative of the third-party issuer that is associated with each electronic asset, and other electronic asset information (e.g., transaction history for groupings of electronic assets or individual electronic assets from within one or more groupings, etc.). In other arrangements, the remote computing system 108 provides access to remotely display, present, or analyze electronic asset information stored at the remote computing system 108 while the remote computing system 108 retains control over the electronic asset information. For example, the remote computing system 108 can provide access to an internet server to present designated electronic asset information through a website for the primary institution 102, when the internet server requests the information, without directly transmitting the data to the internet server.

Figure 2:
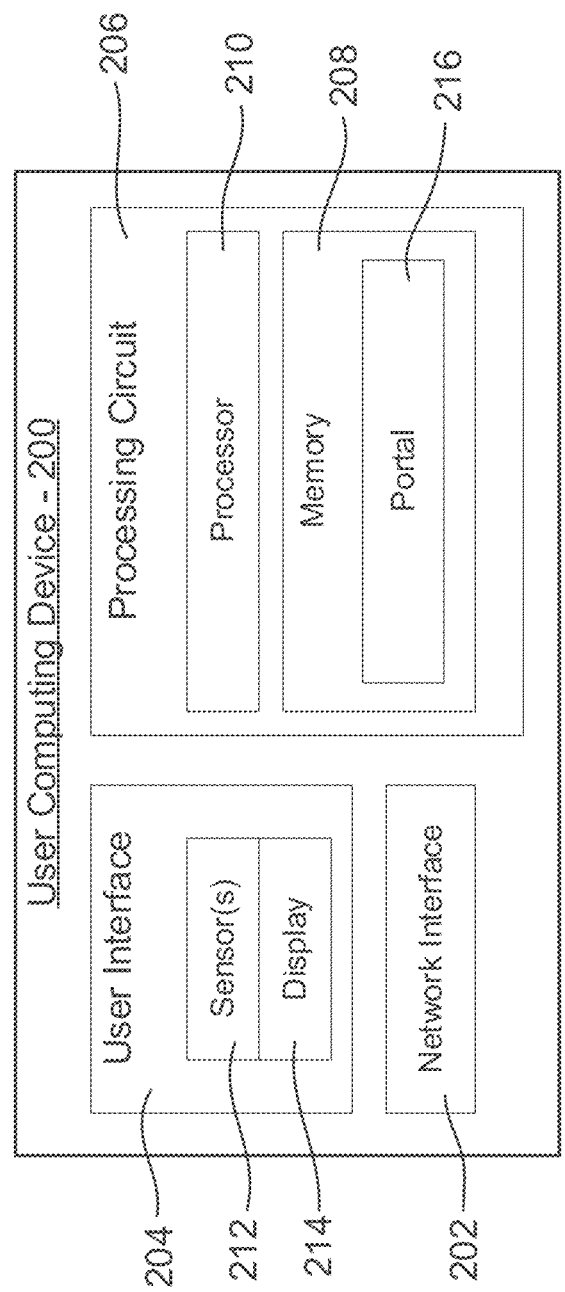
FIG. 2 is a block diagram of a user computing device, according to an example embodiment.

Referring now to FIG. 2, a more detailed view of a user computing device 106 is shown, according to an example embodiment. The user computing device 106 shown in FIG. 2 is a mobile device 200. The mobile device 200 is structured to exchange data over the network 112, execute software applications, access websites, generate graphical user interfaces, and perform other operations described herein. The mobile device 200 may include one or more of a smartphone or other cellular device, a wearable computing device (e.g., eyewear, a watch or bracelet, etc.), a tablet, a portable gaming device, a laptop, and other portable computing devices.

In the example shown, the mobile device 200 includes a network interface 202 (e.g., a transceiver) enabling the mobile device 200 to communicate via the network 112. The mobile device 200 also includes a user interface 204 (an input output (I/O) device, etc.), and a processing circuit 206 including a memory 208 and a processor 210. As shown in FIG. 2, the user interface 204 includes hardware and associated logics configured to exchange information with a user. An input aspect of the user interface 204 allows the user to provide information to the mobile device 200, and may include, for example, a mechanical keyboard, a touchscreen, a microphone, a camera, biometric scanner to receive biometric data such as a fingerprint scanner, any user input device that is engageable to the mobile device 200 via a USB, serial cable, Ethernet cable, and so on. As shown in FIG. 2, the mobile device 200 includes a sensor 212 that is configured to capture image data. The sensor 212 may be a camera or another optical sensor that is built into the mobile device 200. An output aspect of the user interface 204 allows the user to receive information from the mobile device 200, and may include, for example, a digital display 214 (e.g., a touchscreen display, an LCD display, and other monitor types), a speaker, illuminating icons, LEDs, and so on.

The user portal 216 (e.g., user portal circuit, etc.) is structured to provide the user with access to services offered by the primary institution 102 (e.g., the remote computing system 108). The user portal 216 may be, or may be accessed via, a software application that may be provided by or associated with the primary institution 102 (via the remote computing system 108). As such, the user portal 216 may be hard coded onto the memory of the mobile device 200. In another embodiment, the user portal 216 may be one or more web-based interface applications that are supported by a separate computing system comprising one or more servers, processors, network interface circuits, or the like, that transmit the application to the mobile device 200, and where the user has to log onto or access the web-based interface before usage.

The user portal 216 is structured to provide displays to the mobile device 200 that enable the user to view and manage groupings of electronic assets through the remote computing system 108. Accordingly, the user portal 216 is communicably coupled to the remote computing system 108 (e.g., the access control circuit 120 and the electronic asset management circuit 122).

Further, via the user portal 216, the mobile device 200 is configured to receive and display various datasets from the remote computing system 108 to facilitate management and control of the groupings of electronic assets (and individual electronic assets within each grouping). The mobile device 200, via the user portal 216, is configured to render such datasets into the GUI of the user portal 216. As described herein, through such GUIs, the user is able to modify the functionality of certain groupings of electronic assets.

In some embodiments, the mobile device 200 is configured (e.g., via the user portal 216) to perform various operations described herein as being performed by the remote computing system 108. For example, in one embodiment, the user portal 216 includes APIs structured to facilitate exchange of information between the mobile device 200 and the various third-party computing systems 104 independently or at least partially independently from the remote computing system 108.

In some embodiments, the user portal 216 is a separate software application implemented on the mobile device 200. The user portal 216 may be downloaded by the mobile device 200 prior to its usage, hard coded into the memory 208 of the mobile device 200, or be a web-based interface application such that the mobile device 200 may provide a web browser to the application, which may be executed remotely from the mobile device 200. In the latter instance, the user may have to log onto or access the web-based interface before usage of the applications. Further, and in this regard, the user portal 216 may be supported by a separate computing system including one or more servers, processors, network interface circuits, or the like that transmit applications for use to the mobile device 200.

It should be understood that other user computing devices 106 (e.g., user computing devices 106 other than a mobile device 200) may include applications that are similar to the user portal 216 discussed above. For example, a smart appliance may include an application associated with the primary institution 102 that enables the user to exchange information with the remote computing system 108 and/or third-party computing systems 104 to manage groupings of electronic assets. In another example, a smart speaker may include an application through which the user may modify the functionality of at least one grouping of electronic assets via voice commands. In certain embodiments, a user may speak a command, such as "deactivate," "turn off," "restrict," etc., followed by an identification of a set of electronic assets (such as the name of a carrier) to be altered. In some embodiments, the system may verify the voice signature as being that of an owner or other authorized user, decipher the audio in the spoken command to interpret the spoken words as commanding an action upon a specified grouping of electronic assets, and alter the electronic assets in the specified grouping of electronic assets according to the command. In certain embodiments, authenticating the command may require detection of a spoken passcode or sound signature, alternatively or additionally to verification of a voice signature as being that of the owner or authorized user.

Figure 3:
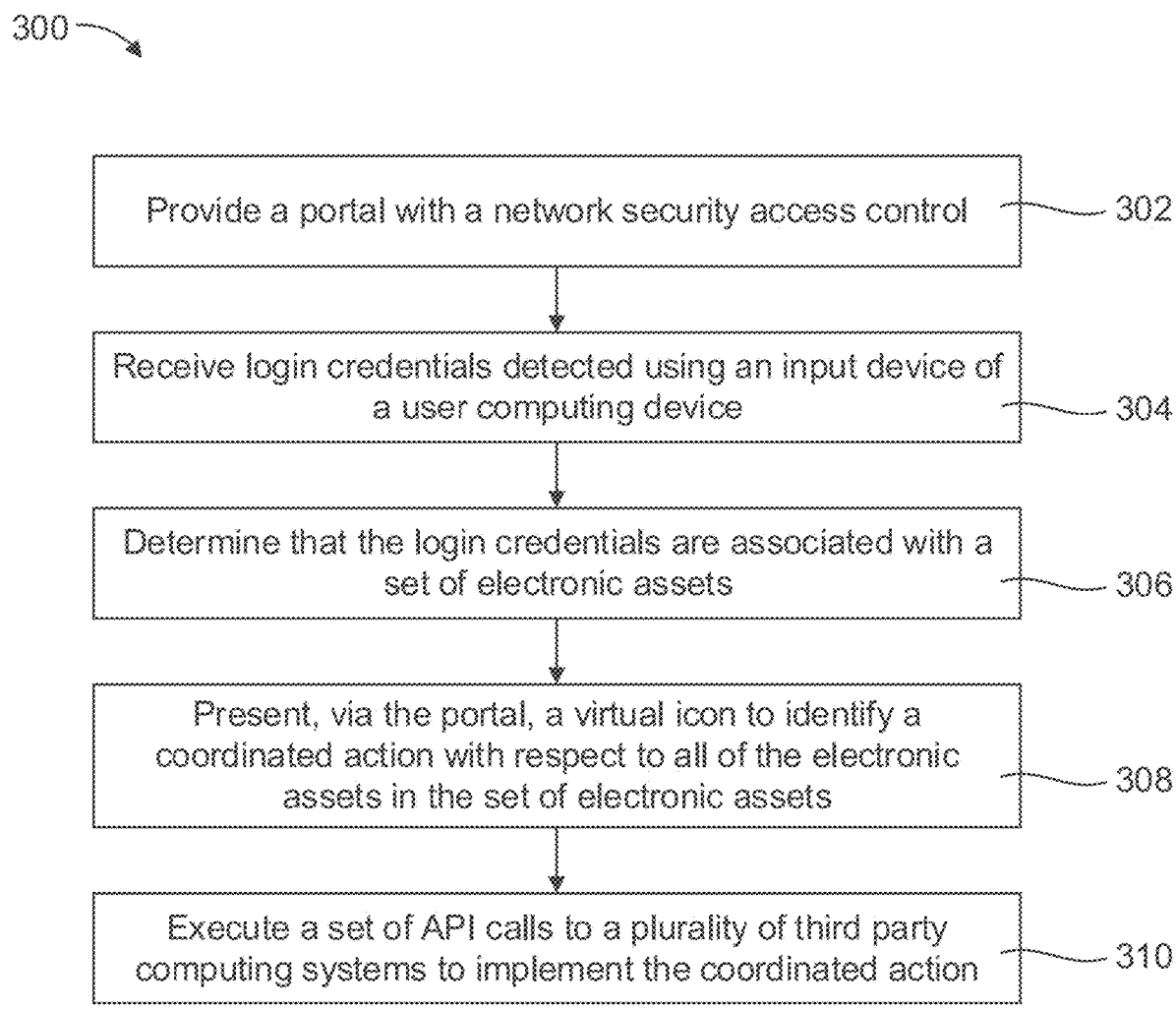
FIG. 3 is a flow diagram of a method of managing a set of electronic assets, according to an example embodiment.

Referring to FIG. 3, a flow diagram of a method 300 of managing groupings of electronic assets is shown, according to an example embodiment. Method 300 may be implemented using the system 100 of FIG. 1, and particularly, by the remote computing system 108 (e.g., by the processor 116 of the remote computing system 108). As such, reference will be made to the system 100 when describing method 300. In another embodiment, at least portions of method 300 may be performed by the user computing device 106. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 300 may be performed simultaneously.

At operation 302, a portal is provided with a network security access control. The portal 216 may be, or may be accessed through, a software application that is provided by a remote computing system 108 to the user computing device 106. For example, the portal 216 may be provided by the remote computing system 108 as a mobile app that is downloaded and installed onto the user computing device 106. In another embodiment, the portal 216 may be hosted at the remote computing system 108 (e.g., via a server, etc.) and may be accessed by the user computing device 106, for example, through a web-browser via an internet connection (e.g., through the network interface 202). The network security access control may be an interface of the portal 216 that prompts an individual to enter login credentials such as biometric data, alphanumeric entries, icon selections, and the like to identify the individual to the remote computing system 108.

The method 300 may further include receiving an authentication request from the user computing device 106 through the network security access control. The authentication request indicates that an individual purporting to be a customer, employee, or other authorized individual is attempting to access the portal 216 to view electronic asset information and/or to control the functionality of groupings of electronic assets. At operation 304, the remote computing system 108 receives login credentials from the user computing device 106. Operation 304 may include receiving, by the user computing device 106, inputs from the user interface 204 (e.g., login credentials that are detected using an input device of the user interface). For example, operation 304 may include receiving biometric data such as fingerprint data from a fingerprint scanner, or image data from a user-facing camera. In another embodiment, operation 304 may include receiving combinations of alphanumeric characters (e.g., a pin, password, etc.), or some combination of different types of user inputs through the user interface 204.

At operation 306, the remote computing system 108 determines that the login credentials are associated with a set of electronic assets, or with an individual who is authorized to manage functionality of the set of electronic assets. The electronic assets may correspond to a plurality of different third-party computing systems 104. The third-party computing systems 104 may include API gateways 130 that are configured to accept API calls directed to changes in the usability (e.g., functionality, operability, etc.) of the electronic assets. Operation 306 may include comparing the login credentials to a list of login credentials stored in the electronic asset database 124 of the remote computing system 108, including login credentials associated with various third-party issuers. Operation 306 may include confirming the login credentials are valid by identifying the login credentials from the list of login credentials to prevent fraudulent access to electronic asset information and control tools.

At operation 308, the remote computing system 108 presents, via the portal 216, a virtual icon. The virtual icon is selectable using the user interface 204 of the user computing device 106 to identify a coordinated action with respect to all electronic assets in the set of electronic assets. The coordinated action may be a change in functionality of all of the assets within a single physical carrier such as activation, deactivation, or other use restrictions. Examples of use restrictions include restrictions on an amount of funds that can be accessed through the electronic asset, transaction limits, a number of transactions, locations where the electronic asset may be used (e.g., geographical locations, certain lists of merchants or businesses, etc.), the types of products that may be purchased or otherwise accessed using the electronic asset, physical or virtual locations which may be accessed via an electronic key, and the like. Other examples of use restrictions include requiring pre-approval of transactions (e.g., requiring confirmation by an account owner before a transaction can be processed, etc.) or restrictions that require notifications to the asset owner each time the asset is used. Yet another example of a coordinated action is ordering a replacement of all of the assets within a set of electronic assets (e.g., submitting a request to have new electronic assets mailed or otherwise delivered to the asset owner, etc.). The virtual icon may be a selectable interface (e.g., toggle, indicator, etc.) that is accessible from within the portal 216, and that allows a user to toggle between different functionalities that are available for the set of electronic assets. In another embodiment, the portal 216 is at least partially integrated with and forms part of an operating system of the user computing device 106. In this way, the virtual icon may be presented on an interface of the operating system (e.g., a home screen, desktop view, etc.) of, for example the mobile device.

Figure 4:
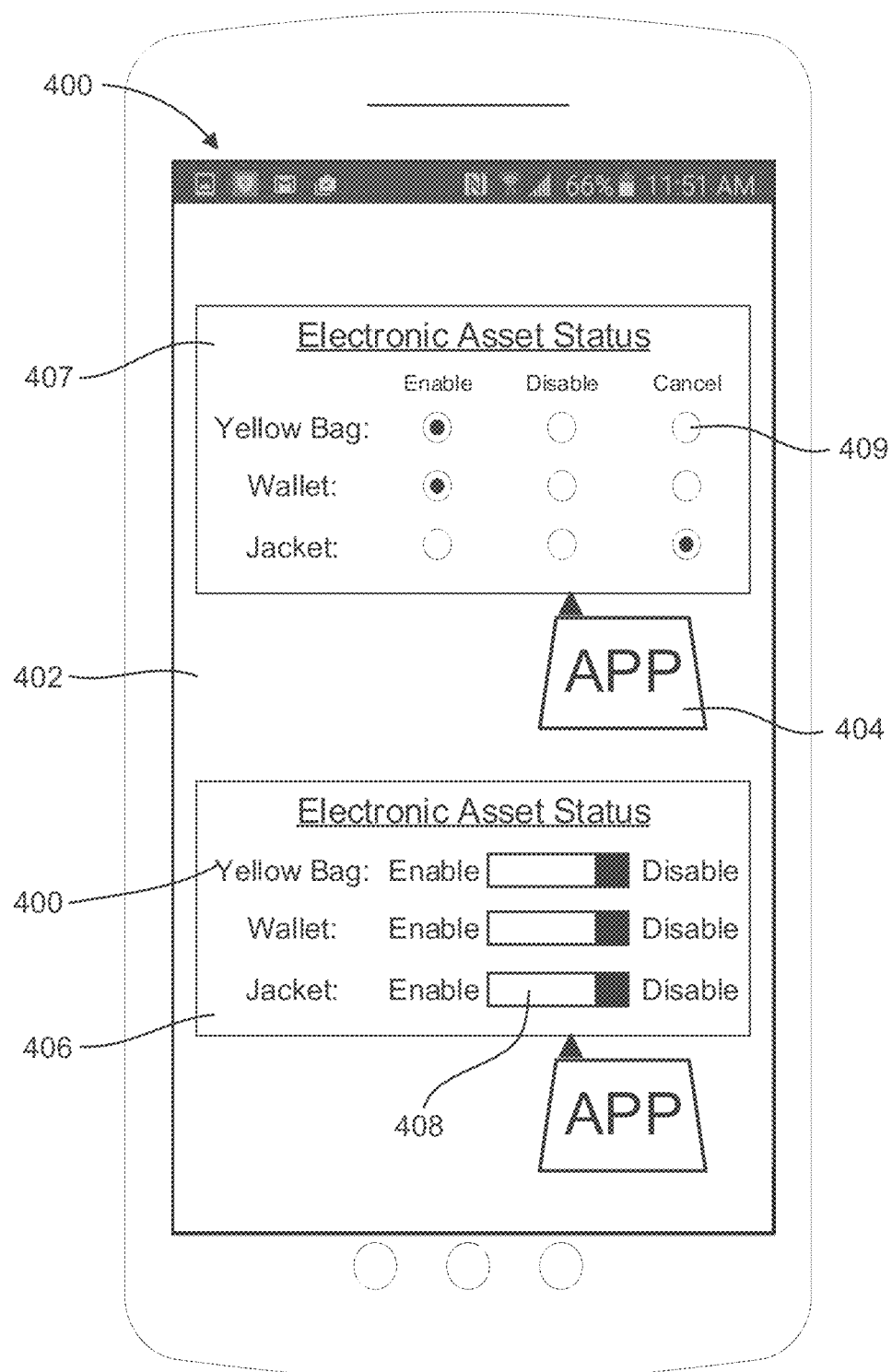
FIG. 4 is an example interface for a user computing device, according to an example embodiment.

Referring to FIG. 4, an example display 400 of a mobile device (e.g., mobile device 200) is shown, according to an example embodiment. The example display 400 presents a home screen 402 of the mobile device from which the user may access different applications. The home screen 402 forms part of a GUI of the operating system that presents tiles 404, with each tile 404 corresponding with an application that is installed (or installable) on the mobile device. In the example of FIG. 4, the home screen 402 of the mobile device provides for a tile overlay mode, or shortcut access mode that is initiated upon detection of a certain gesture or other input, such as a press and hold gesture, a double tap or triple tap on the tile 404, and/or other gestures or inputs that differ from the gestures or inputs used to indicate application launch or tile movement. The tile overlay mode may allow the user to make selections of virtual icons and perform operations to affect the usability of one or more sets of assets with a minimal number of gestures (e.g., without launching the application, etc.). In another embodiment, the tile 404 itself is the virtual icon, which is selected by a specific gesture or input (e.g., a triple tap, which automatically selects the virtual icon to enable/disable or otherwise modify the functionality of a specific set of assets).

As shown in FIG. 4, the tile overlay mode generates a GUI (e.g., shortcuts menu, selection pane, etc.) that is configured to present selection options (e.g., virtual icons) to the user. A first example selection GUI 406 is shown toward the lower end of the display 214 of the mobile device in FIG. 4. The first selection GUI 406 includes a list. A first column (e.g., leftmost column as shown in FIG. 4) includes a listing of identifiers 408 for each set/grouping of electronic assets. In the example of FIG. 4, the identifiers 408 are the names of individual carriers (e.g., yellow bag, wallet, jacket, etc.) in which the set of electronic assets is physically contained. A second column (e.g., rightmost column as shown in FIG. 4) includes a listing of selections (e.g., coordinated actions) for each set of electronic assets. In the first selection GUI 406, the selection for each set of assets is a toggle 408 that can be selected, through the user interface 204, to enable or disable (e.g., freeze or otherwise restrict the use of) all of the electronic assets within each carrier. In this way, the coordinated action can be taken across all assets in a set of electronic assets with a single click, rather than having to individually specify the desired change in functionality for each individual asset. The first selection GUI 406 also shows the current status of each set of assets by the current position of the toggle 408.

In another embodiment, the number of selections and selection options presented for each set of electronic assets may be different. For example, FIG. 4 also shows a second selection GUI 407, in which multiple options are provided for modifying the functionality of each set of electronic assets. Selections are made by touching the desired selection container 409 in the second selection GUI 407 (e.g., by a single tap on the selection container 409 on a touchscreen display, etc.). Options include enabling or disabling (e.g., freezing) each set of electronic assets, and canceling each set of electronic assets (e.g., permanently deactivating and/or ordering new electronic assets). In other embodiments, the types of coordinated actions that may be selected from the GUIs may be different. For example, selections may include a limited operability mode and/or restricted access mode, which permits only certain transactions to be performed by the electronic assets (e.g., only being used within a certain geographical area, at only certain stores or on only certain types of products, only during certain times of day, limited transaction amounts, etc.). Such functionality is particularly useful when a user has provided one of his/her carriers to a relative or another trusted individual (e.g., a child, etc.) for temporary use. In another embodiment, the virtual icon may be accessible from a different GUI that is separate from the mobile app tile 404. For example the virtual icon may be accessed from a drop-down menu of the operating system on the mobile device (e.g., when the user swipes downward from the top of the touchscreen display from the home screen, etc.). In various embodiments, any available changes (e.g., alterations to the functionality) to the electronic assets may be presented as options, and the changes may be predefined as "modes" (e.g., user defined modes for the assets that may be presented in place of, or in addition to, "enable" and "disable"), such as "daytime" mode to restrict the electronic assets to usability during a predefined time period (e.g., as 7 am to 7 pm, or between sunrise and sunset times for the physical location of the electronic assets, which may be determined, e.g., via a GPS of the electronic asset, via a device to which the electronic asset is presented, and/or via a device which otherwise detects the electronic asset when physically nearby).

Returning to FIG. 3, operation 308 may further include accepting, by the remote computing system 108, via the portal 216, selection of the virtual icon that is detected from the user interface 204. Operation 308 may include receiving, via the network interface 110, a signal from the user computing device 106 that indicates the desired selection, and confirming the selection by comparing the selection to a list of available coordinated actions stored in the electronic asset database 124.

At operation 310, the remote computing system 108, in response to accepting the selection via the portal 216, executes a set of API calls to each third-party computing system 104 to synchronously, or substantially synchronously implement the coordinated action across all of the electronic assets that are contained within a single carrier. Operation 310 may include identifying a list of asset-specific API calls that correspond with the required procedures for different, unaffiliated third-party computing systems 104 (e.g., third-party computing systems 104 having different security protocols, third-party computing systems 104 associated with separate unrelated entities and/or institutions). For example, operation 310 may include matching the selection with a set of asset-specific API calls stored in the electronic asset database 124 using a selection engine, or by crawling through the electronic asset database 124 to match the selection with an appropriate identifier that corresponds with the selection. Operation 310 may include transmitting, by the network interface 110, via the API calls, the coordinated action for each asset in the set of electronic assets to a corresponding one of the third-party computing systems 104 (e.g., via API gateways 130 of the third-party computing systems 104). In one embodiment, the remote computing system 108 is configured to transmit the asset-specific API calls in parallel, which reduces the time required to perform the coordinated action across all of the assets within the set of electronic assets. In other embodiments, the remote computing system 108 is configured to transmit the asset-specific API calls in a controlled sequence to reduce the average time required to activate, deactivate, restrict, or otherwise control each electronic asset of the set of electronic assets. For example, the remote computing system 108 may be configured to transmit API calls in a prescribed sequence to control the functionality of assets with less robust/complex security protocols first, to focus processing power on those assets before transmitting API calls to third-party computing systems 104 with more robust and/or complex security protocols. In some embodiments, a prescribed sequence may be based on the characteristics of the electronic assets (such as vulnerability to security breach) or other factors such as, for example, time of day, season, physical location, etc. (e.g., certain assets may me more vulnerable to security breach at certain times, and/or may less computationally demanding to alter at certain times, and such assets may be prioritized over relatively less vulnerable assets or relatively more computationally demanding assets depending on when the command to alter the electronic assets is received). In various embodiments, such a prescribed sequencing for effecting alterations to the functionality of a set of electronic assets may maximize or otherwise enhance efficiency by, for example, altering the functionality of the largest number of electronic assets (at least electronic assets of certain types) in the shortest amount of time. Operation 310 may include transmitting information associated with the user (e.g., login credentials, user information, etc.) to confirm the identity of the user to the third-party computing systems 104, along with the selection.

Operation 310 may further include operations performed by the third-party computing systems 104 to implement the coordinated action. For example, the third-party computing systems 104 may determine whether the information transmitted via the third-party APIs 128 is sufficient to complete the coordinated action. In the event that further information is required, the third-party computing systems 104 may transmit notifications, via the network 112 to one, or a combination of, the remote computing system 108 and the user computing device 106. The notifications may include a prompt that requests additional user information to complete the requested action. For example, the prompt (e.g., text, pop-up, etc.) may be a notification on the user computing device 106 to confirm that they requested the coordinated action.

Figure 5:
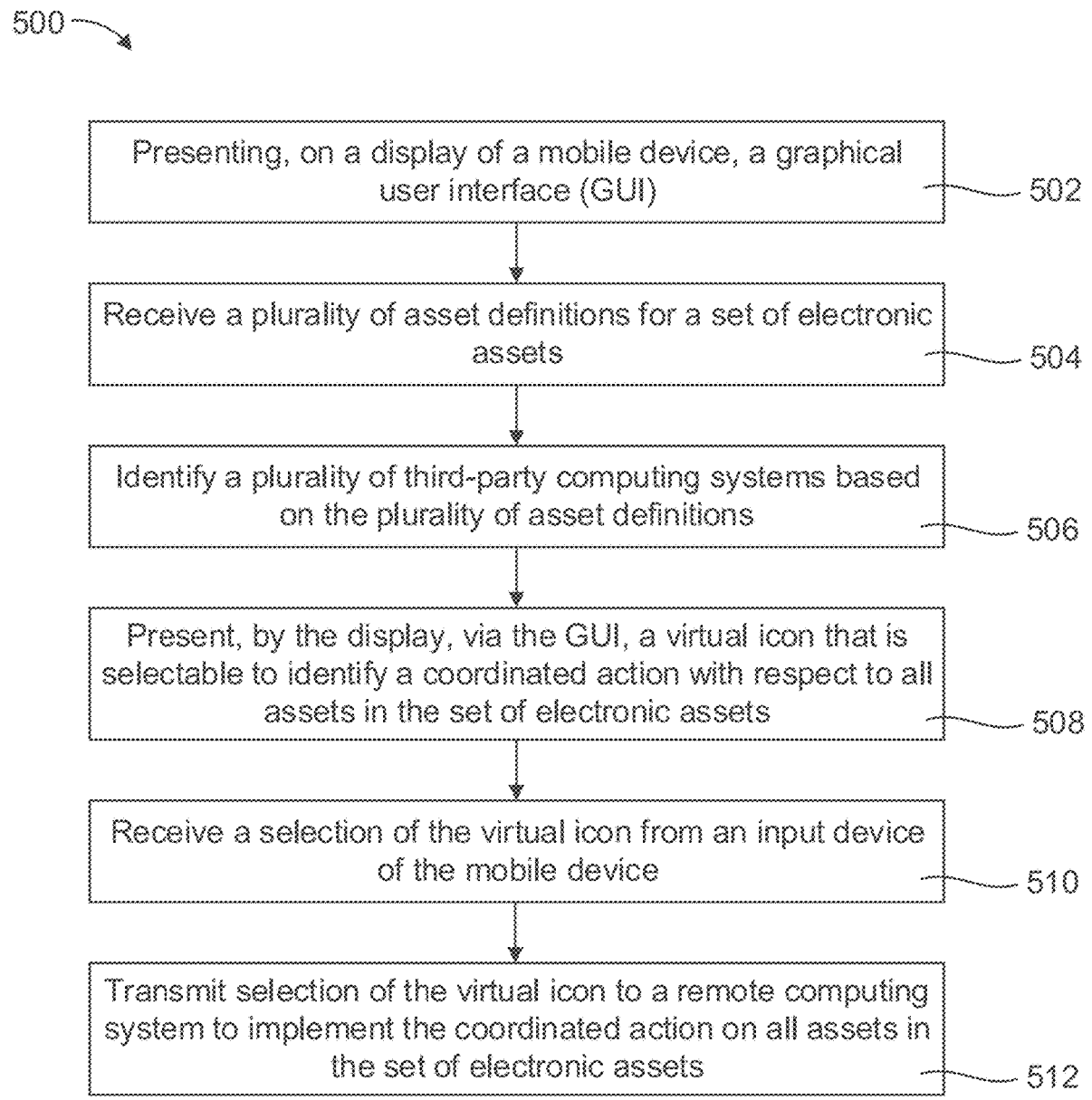
FIG. 5 is a flow diagram of a method of populating a set of electronic assets into an electronic asset management system, according to an example embodiment.

Referring to FIG. 5, a flow diagram of a method 500 of populating a set of electronic assets into an electronic asset management system is shown, according to an example embodiment. Method 500 may be implemented using the system 100 of FIG. 1, and particularly, the mobile device 200 of FIG. 2 (e.g., the processor 210 of the mobile device 200). As such, reference will be made to the mobile device 200 of FIG. 2. However, it will be appreciated that in other embodiments, a different user computing device 106 may be used (e.g., a desktop computer, an IoT device, etc.). In another embodiment, additional, fewer, and/or different operations may be performed.

At operation 502, the mobile device 200 presents, on the display of the mobile device 200, a GUI. Operation 502 may include receiving a selection of a software app that corresponds to the portal 216 from the home screen of the mobile device 200, or receiving a command to navigate to the portal 216 from a web-browser installed on the mobile device 200. Operation 502 may also include receiving login credentials from the user interface 204 of the mobile device 200 to access the portal 216.

At operation 504, the mobile device 200 receives, from the user interface 204, a plurality of asset definitions for a set of electronic assets. Each asset definition may include a third-party identifier that is indicative of a respective one of the plurality of third-party issuers (e.g., third-party computing systems 104). The third-party identifier may be a name of one of the third-party issuers. In other embodiments, the third-party identifier may be a logo that is associated with the third-party issuer. The asset definitions may also include other information regarding the electronic assets, such as an account number associated with the asset, expiration information, security codes, and/or identifying information for the user (e.g., user name, date of birth, etc.). The asset definitions together may form a carrier definition that identifies all of the assets within a single group (e.g., a group representative of a single physical carrier, etc.). Operation 504 may include receiving manual entry of the asset definitions from the user interface 204 (e.g., via a keyboard, etc.). In other embodiments, the asset definition may include one or more images or scans of the electronic asset (e.g., taking a picture of the electronic asset, reading a magnetic strip on the back of the asset, etc.), and/or communications with the electronic assets (through, e.g., near-field communications with embedded microchips in the electronic assets, an RED tag, or another contactless card identification technique) as will be further described.

Figures 6, 7:
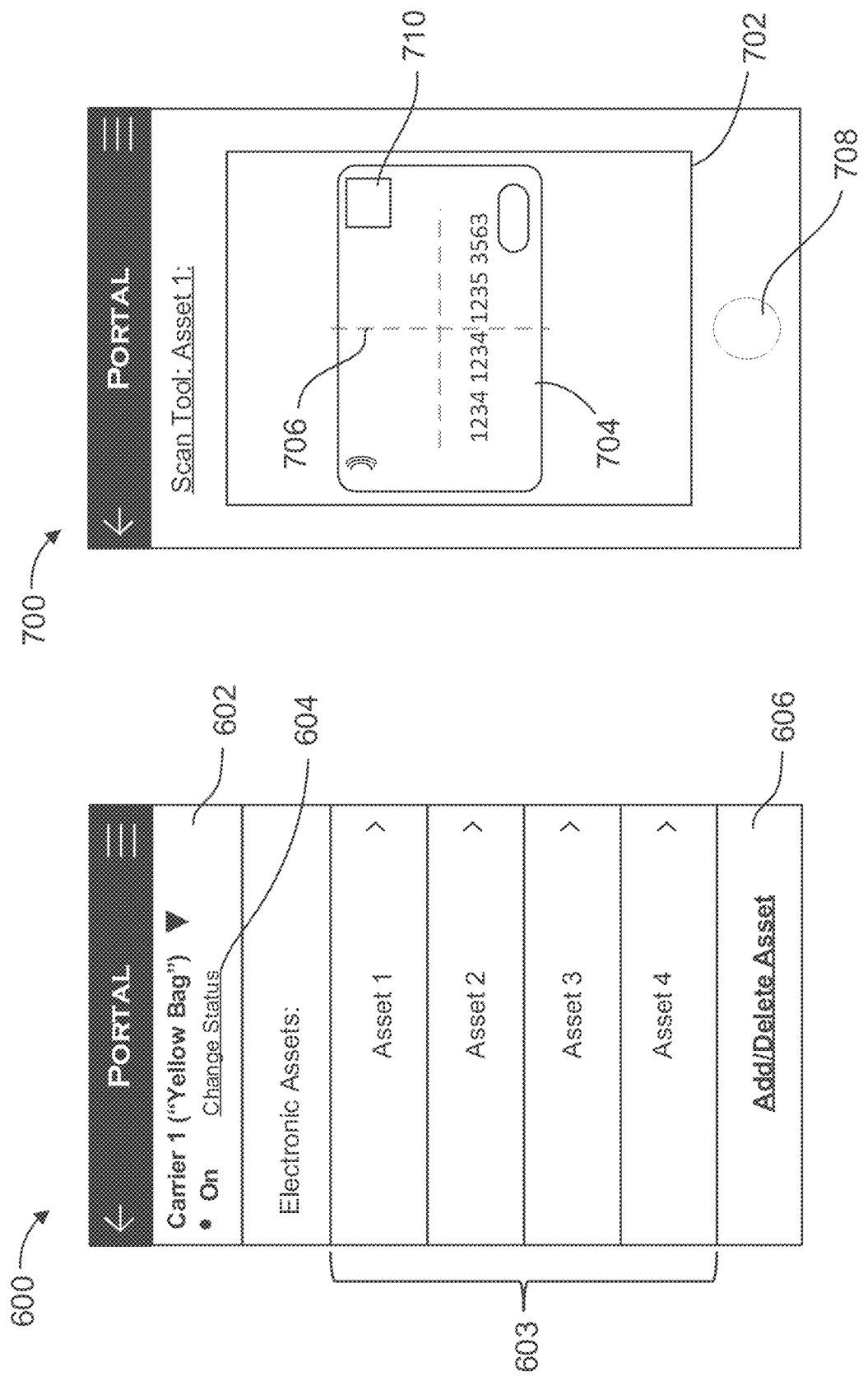
FIGS. 6 and 7 are example interfaces for a user computing device, according to various example embodiments.

FIGS. 6 and 7 show example interfaces that may be presented in the portal 216 to facilitate entry of asset definitions. In particular, FIG. 6 shows an interface 600 that is used to present carrier and asset definitions to a user. As shown in FIG. 6, the interface 600 includes a header label 602 that identifies the selected carrier and the electronic assets contained within the carrier. The header label 602 also includes a status indicator that shows the current operability of the set of electronic assets (e.g., whether the electronic assets are enabled, or disabled, deactivated, or otherwise restricted). The header label 602 also includes a virtual icon 604 that can be used to select coordinated actions, or to access a listing of virtual icons that correspond to different coordinated actions. The set of electronic assets are represented in FIG. 6 by a plurality of asset labels 603. Additional information regarding each individual asset from the set of electronic assets may be accessed by selecting a corresponding one of the asset labels 603. The asset labels 603 may also provide user access to a modifications interface that can be used to modify/edit electronic asset information (e.g., asset definitions) through the user interface 204. Additionally, a selection pane 606 at the bottom of the interface 600 allows a user to add or delete assets from the defined set of electronic assets.

In some embodiments, the portal 216 includes a scan tool that provides automated entry of asset definitions, and which significantly reduces the required amount of user interaction with the portal 216. The scan tool may be configured to exchange information with one or more user interfaces 204. For example, FIG. 7 shows an example scan tool interface 700 that is configured to exchange information with a sensor 212 of the user interface 204. In particular, the scan tool interface 700 is configured to exchange information with and control operation of a camera or other optical sensor onboard the mobile device 200. As shown in FIG. 7, the scan tool interface 700 includes a window 702 that provides real-time image data from the camera. In this example, the camera is facing a credit card 704 that is positioned behind the mobile device 200. The window 702 may include various alignment indicators 706 and/or other features to facilitate user interaction with the scan tool and to improve feature recognition of the credit card or other electronic asset. For example, the alignment indicators 706 may include a cross-hatch pattern on the center of the window 702, which may change color depending on the how well the electronic asset is aligned with the window 702 or encompassed by the window 702. The scan tool interface 700 may be configured to control the camera (e.g., to refocus the camera, to modify lighting provided by an external LED or other illuminating device, etc.) to improve recognition of image data captured by the camera. The scan tool interface 700 may also include a capture button 708 to take a snapshot of the real-time image data for further processing by the portal 216, which may be performed onboard the mobile device 200 and/or remotely (e.g., by the remote computing system 108).

In various embodiments, other (e.g., contactless) asset identification techniques may be employed to obtain information regarding the electronic assets. For example, the portal 216 may be configured to interface with a magnetic card reader that is connected to the user computing device 200, to identify the asset by reading a magnetic strip integrated into the asset (e.g., by swiping a credit card through a magnetic reader, etc.). The portal 216 may be configured to receive the information regarding the electronic asset through the reader, and/or another form of scanner/reading hardware. In another embodiment, at least one electronic asset may be identified through wireless (e.g., radio frequency) communications between the mobile device 200 and the electronic asset. For example, the electronic asset may include a radio chip, antennae, RFID tag, or another near-field communication technology to transmit information regarding the electronic asset. The portal 216 may be configured to receive the information regarding the electronic asset through the network interface 202 (e.g., a transceiver) of the mobile device 200, and/or another wireless communications interface. For example, the portal 216 may be configured to wirelessly communicate with the electronic asset and receive a data packet from the electronic asset (e.g., the third party identifier) when the electronic asset is placed near the mobile device 200. The data packet may include the information regarding the electronic asset, which may be encrypted to prevent fraudulent duplication of the electronic asset. In one embodiment, the portal 216 may be configured to receive information regarding the entire set of electronic assets simultaneously; for example, from any carrier that is placed near the mobile device 200 that contains multiple electronic assets using near-field technology. In various potential embodiments, one or more electronic assets and/or devices with which the electronic assets interface may employ "EMV" standards (managed by EMVCo). EMV specifications include, for example, encrypted data exchange standards for cards via either microchip insert or contactless functions. EMV specifications and standards relate to contact, contactless, mobile, payment tokenization, QR code, secure remote commerce, and 3-D secure technologies.

Returning to FIG. 5, the method 500 further includes identifying a plurality of third-party computing systems based on the plurality of asset definitions, at 506. Operation 506 may include analyzing the image data, retrieved from the camera, to determine an API identifier that corresponds with one of the plurality of third-party issuers (e.g., third-party computing systems 104). For example, operation 506 may include using optical character recognition to convert portions of the image data into machine-readable text. The portion of the image data may correspond with a logo 710 including a name of the third-party issuer or a symbol that is synonymous with the identity of the third-party issuer. Operation 506 may further include matching the machine-readable text to an API identifier of a plurality of API identifiers (e.g., from a list of API identifiers stored in memory). Operation 506 may include using one or more neural network models (e.g., convolutional neural networks, etc.) to facilitate identification of the API identifier. In one embodiment, operation 506 includes extracting pixel features from the image data, analyzing the features (e.g., color depth of each pixel, etc.), and comparing the features and their arrangement with known logos 710 (e.g., logos stored in the electronic asset database 124) to determine the API identifier.

In an embodiment where at least one electronic asset includes a wireless communication device, operation 506 may include analyzing the signal received from the electronic asset to determine the API identifier. Operation 506 may include decrypting the signal (e.g., data packet) from the electronic asset using a key or other data decryption methodology employed by a respective one of the third-party issuers. The key may be provided by the third-party issuer, and may be selected by the processor based on the signal (e.g., the type of signal, content of the signal, etc.) that is received from the electronic asset (e.g., from a list stored in memory). In another embodiment, operation 506 may include transmitting the signal to at least one of the third-party computing systems 104 for further processing and dissemination. In other words, the remote computing system 108 may be configured to query the third-party computing systems 104 for data/information related to the electronic asset by transmitting the signals associated with the electronic assets.

At operation 508, the mobile device 200 presents, through the display 214, via the portal 216, a virtual icon that is selectable to identify a coordinated action with respect to all of the assets within a set of electronic assets. The virtual icon may be the same or similar to the virtual icon described with reference to FIG. 4. For example, the virtual icon may be presented by the display 214 as a selectable tile on a home screen of the mobile device 200. In another embodiment, the virtual icon may be a selectable toggle from within the portal 216. At operation 510, the mobile device 200 receives a selection of the virtual icon from a user interface of the mobile device 200. Operation 510 may include receiving a command signal from a keyboard, touchscreen, and/or microphone of the mobile device 200 that is indicative of user interaction with the virtual icon. At operation 512, the mobile device 200 transmits the selection of the virtual icon to the remote computing system 108 to implement the coordinated action on all assets in the set of electronic assets, as described in detail with reference to the method 300 of FIG. 3.

Figure 8:
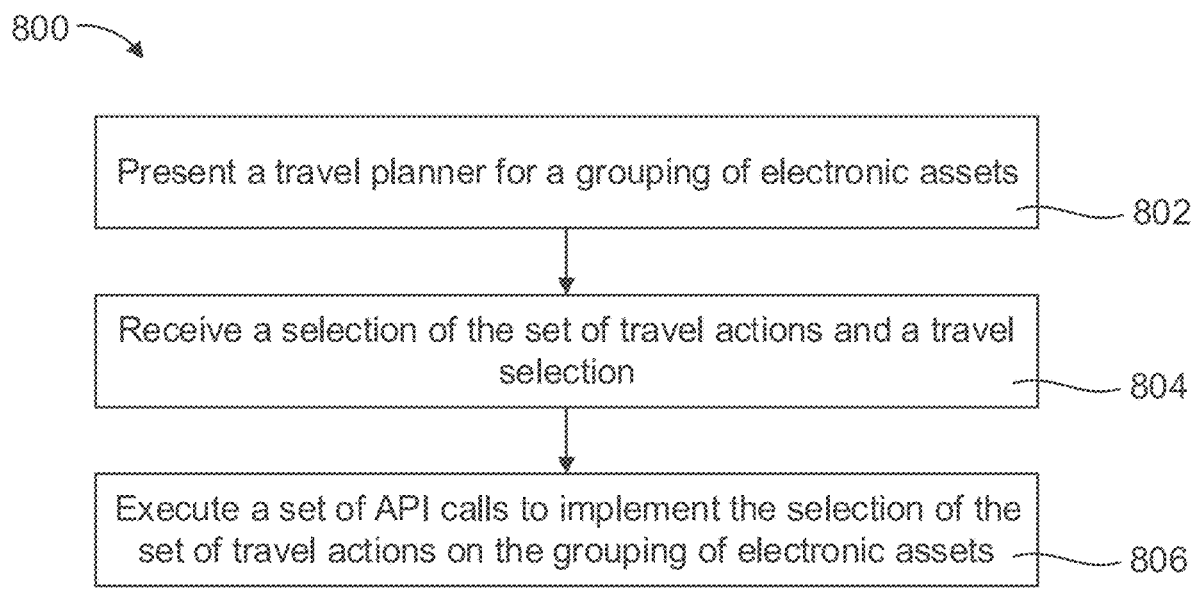
FIG. 8 is a flow diagram of a method of implementing a coordinated action on a set of electronic assets based on a travel plan, according to an example embodiment.

Referring to FIG. 8, a flow diagram of a method 800 of implementing a coordinated action on a set of electronic assets based on a travel plan is shown, according to an example embodiment. As with other methods described herein, method 800 may be implemented using the system 100 of FIG. 1 (e.g., via a user computing device such as the mobile device 200, a different user computing device 106, the remote computing device 108, or some combination thereof). As such reference will be made to elements of the system 100 and mobile device 200 when describing method 800. In another embodiment, the method 800 may include additional, fewer, and/or different operations.

At operation 802, the mobile device 200 presents, on the display 214 of the mobile device 200, a travel planner for a grouping of electronic assets. The grouping may be the set of electronic assets for at least one carrier, or some combination of individual assets from multiple carriers. The grouping may include electronic assets that will be carried with the user while travelling. In another embodiment, the grouping may include electronic assets that will remain behind, and are to be frozen or disabled during travel to prevent fraudulent use. Operation 802 may include receiving a selection, via the user interface 204, of a software app corresponding to the portal 216 from the home screen of the mobile device 200, or receiving a command to navigate to the portal 216 from a web-browser installed on the mobile device 200. Operation 802 may further include navigating through the portal 216 to the travel planner.

Figure 9:
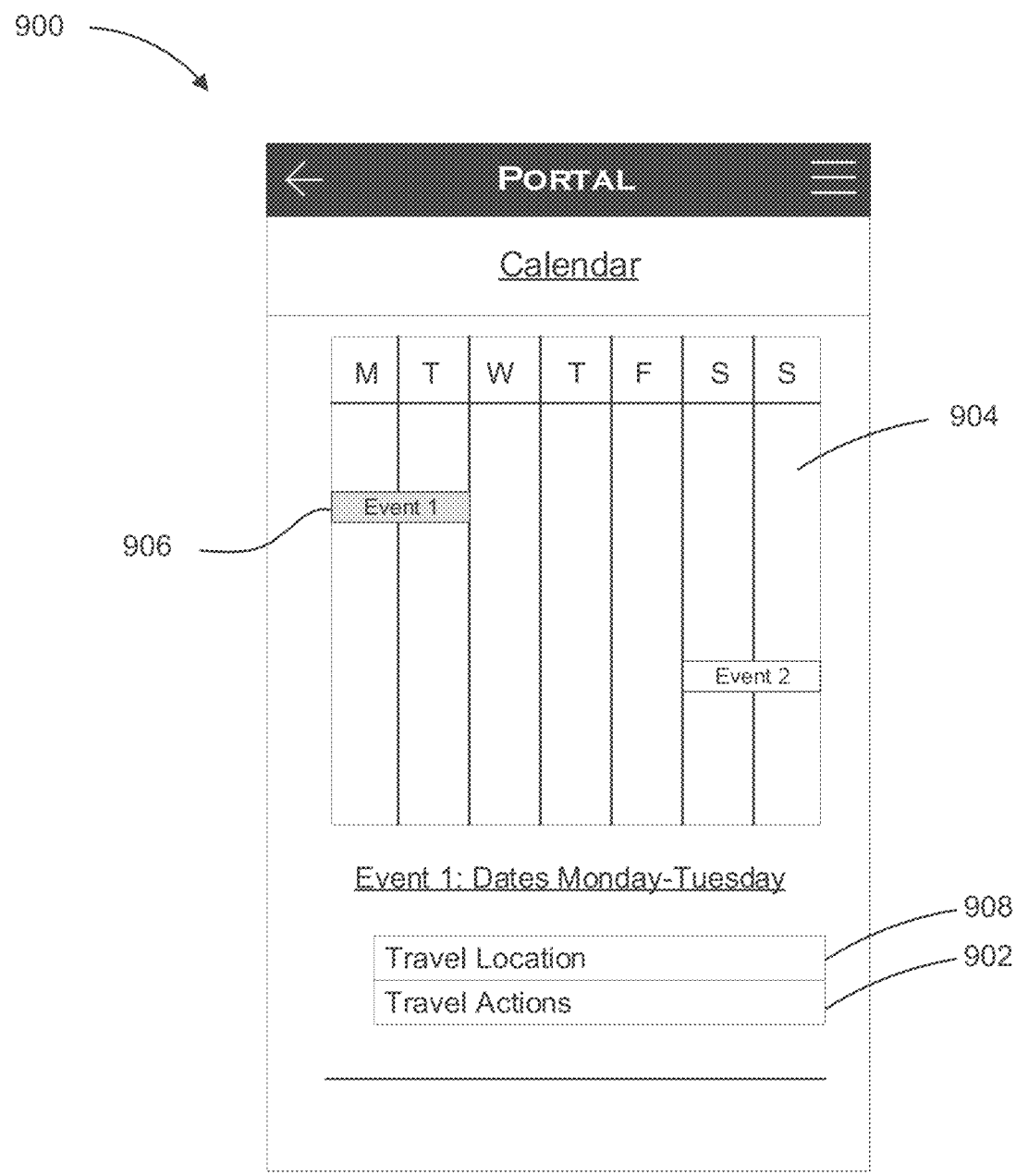
FIG. 9 is an example interface for a user computing device, according to another example embodiment.

FIG. 9 shows an example travel planner 900 that may be accessed through the portal 216 by the mobile device 200, according to an embodiment. The travel planner 900 is selectable by the user interface 204 of the mobile device 200 to identify a set of travel parameters. The travel parameters may include travel actions to be taken with respect to a grouping of electronic assets, and a travel selection indicative of at least one of a location of travel and/or a date of travel. The travel actions may be one or more coordinated actions to apply to a grouping of electronic assets. For example, the travel actions may be coordinated actions that enable the use of the grouping of electronic assets in different geographical areas (e.g., areas outside of the range of typical use, in different states and/or countries than where the user resides). In another embodiment, the travel actions may be coordinated actions that increase a transaction limit, account balance, or number of transactions to thereby accommodate the needs of the user during travel. For example, the user may need access to additional funds from their credit card during travel to accommodate stays in hotels, food, and related purchases. In the embodiment of FIG. 9, the travel planner 900 includes a travel actions button 902 to facilitate the selection of travel actions. The travel actions button 902 may generate a separate selection window with a listing of the different groupings of assets and virtual icons with different coordinated actions for each grouping.

The travel selection may be a combination of information that informs the remote computing system 108 about where the user will travel (e.g., the state, country, etc.) and when the travel will occur (i.e., the dates of travel). As shown in FIG. 9, the travel planner includes a calendar interface 904 to facilitate the assignment of travel dates and times. Commands received by the portal 216, via the user interface 204, are used to add, delete, or otherwise manipulate events 906 on the calendar. A separate travel location button 908 is provided by the travel planner 900 to facilitate the selection of geographical areas at which the grouping of assets will be used.

Returning to FIG. 8, the method 800 additionally includes receiving a selection of travel parameters from the user interface 204, including the travel actions and the travel selection, at 804. Operation 804 may further include transmitting the travel parameters, via the network interface 202 of the mobile device 200, to the remote computing device 108. Operation 804 may further include storing the travel parameters in the electronic asset database 124 for monitoring and future use. In one embodiment, operation 804 includes initializing a transmission delay to prevent the travel actions from being transmitted to the third-party computing systems 104 until the date of travel, or some threshold period in advance of the date of travel.

At operation 806, the remote computing device 108, in response to accepting the selection of travel parameters via the portal 216 (prior to or at the beginning of travel), executes a set of API calls to implement the selection of travel parameters on the grouping(s) of electronic assets. In one embodiment, operation 806 includes executing the set of API calls to the third-party computing systems 104 after the transmission delay has elapsed.

It is noted that any of the features, selectors, icons, functionalities, information, elements, or other aspects of any one interface or figure may be combined or swapped with or applied to any of the features, selectors, icons, functionalities, information, elements, or other aspects of any other interface or figure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   providing, by a processor of a computing system through a network, to a remote computing device, a portal with a network security access control;
   receiving via the portal, by the processor, for the network security access control, login credentials and verifying that the login credentials grant access to an account associated with a set of electronic assets corresponding to a plurality of third-party computing systems with application programming interface (API) gateways configured to accept API calls directed to changes in functionality of the electronic assets;
   receiving, by the processor and via the portal, a selection of a coordinated action with respect to all electronic assets in the set of electronic assets; and
   executing, by the processor, based on the selection, a set of API calls comprising an asset-specific API call to each third-party computing system in the plurality of third-party computing systems to implement the coordinated action on all electronic assets in the set of electronic assets.

2. The method of claim 1, further comprising:
   determining, by the processor, an asset definition for each of the set of electronic assets, each asset definition comprising a third-party identifier that is indicative of a respective one of the plurality of third-party computing systems; and
   identifying, via the processor, the plurality of third-party computing systems based on the plurality of third-party identifiers.

3. The method of claim 2, wherein one of the set of electronic assets comprises an asset definition comprising a third-party identifier indicative of a corresponding one of the plurality of third-party computing systems, wherein the third-party identifier comprises a logo, wherein the method further comprises identifying the corresponding one of the plurality of third-party computing systems, and wherein identifying the corresponding one of the plurality of third-party computing systems comprises:
   using optical character recognition to convert the logo to machine-readable text; and
   matching the machine-readable text to one of a plurality of API identifiers corresponding to the asset-specific API call.

4. The method of claim 1, further comprising determining, by the processor, an asset definition for each of the set of electronic assets, each asset definition comprising a third-party identifier that is indicative of a respective one of the plurality of third-party computing systems, wherein determining the asset definition for at least one electronic asset of the set of electronic assets comprises:
   receiving, by the processor, an image of the electronic asset captured using an optical sensor of the computing device; and
   analyzing, by the processor, the image to determine the third-party identifier.

5. The method of claim 1, further comprising determining, by the processor, an asset definition for each of the set of electronic assets, each asset definition comprising a third-party identifier that is indicative of a respective one of the plurality of third-party computing systems, wherein determining the asset definition for at least one electronic asset of the set of electronic assets comprises:
   receiving, by the processor, a data packet acquired via a transceiver of the computing device communicating with the at least one electronic asset to acquire the data packet therefrom; and
   analyzing, by the processor, the data packet to determine the third-party identifier.

6. The method of claim 1, wherein each of the set of electronic assets comprises an asset definition comprising a third-party identifier indicative of a respective one of the plurality of third-party computing systems, wherein the asset definitions together form a carrier definition, the method further comprising receiving, by the processor from the computing device, a plurality of carrier definitions, each carrier definition of the plurality of carrier definitions associated with a different carrier.

7. The method of claim 1, wherein one of the set of electronic assets comprises an asset definition comprising a third-party identifier indicative of a corresponding one of the plurality of third-party computing systems, wherein the third-party identifier comprises a logo, wherein the method further comprises identifying the corresponding one of the plurality of third-party computing systems, and wherein identifying the corresponding one of the plurality of third-party computing systems comprises associating the logo with one of a plurality of API identifiers corresponding to the asset-specific API call.

8. The method of claim 1, further comprising:
   presenting, by the processor, via the portal, a travel planner configured to be selectable using an input device of the remote computing device to identify a set of travel actions to be taken with respect to a grouping of electronic assets, and a travel selection indicative of at least one of a location of travel or a date of travel, the grouping of electronic assets comprising at least one electronic asset from the set of electronic assets;
   receiving, by the processor, via the portal, selection of the set of travel actions and the travel selection; and
   executing, by the processor, based on the selection, the set of API calls to implement the selection of the set of travel actions on the grouping of electronic assets.

9. The method of claim 1, wherein the portal forms part of an operating system of the computing device, and wherein the selection is presented from one of a shortcuts screen or an application tile that corresponds to a provider application for one of the electronic assets.

10. The method of claim 1, wherein the set of electronic assets comprises a non-payment item.

11. The method of claim 1, wherein the coordinated action imposes restrictions on the usability of each one of the set of electronic assets.

12. The method of claim 1, wherein the coordinated action is ordering replacements of each one of the set of electronic assets.

13. A computing system having a processor and a memory storing executable code which causes the computing system, when executed, to:
provide, via an internet connection, to a computing device, access to a portal with a network security access control;
receive, via the portal, login credentials and verify that the login credentials grant access to an account associated with a set of electronic assets corresponding to a plurality of third-party computing systems with application programming interface (API) gateways configured to accept API calls directed to changes in functionality of the electronic assets;
receive, via the portal, a selection of a coordinated action with respect to all electronic assets in the set of electronic assets; and
execute, based on the selection, a set of API calls comprising an asset-specific API call to each third-party computing system in the plurality of third-party computing systems to implement the coordinated action on each corresponding electronic asset in the set of electronic assets.

14. The computing system of claim 13, wherein the executable code further causes the computing system, when executed, to:
determine, via the portal, an asset definition for each of the set of electronic assets, each asset definition comprising a third-party identifier that is indicative of a respective one of the plurality of third-party computing systems; and
identify the plurality of third-party computing systems based on the plurality of third-party identifiers.

15. The computing system of claim 13, wherein the executable code further causes the computing system, when executed, to determine an asset definition for each of the set of electronic assets, each asset definition comprising a third-party identifier that is indicative of a respective one of the plurality of third-party computing systems, wherein determining the asset definition for at least one electronic asset of the set of electronic assets comprises:
receiving, via the portal, an image of the electronic asset captured using an optical sensor of the computing device; and
analyzing the image to determine the third-party identifier.

16. The computing system of claim 13, wherein one of the set of electronic assets comprises an asset definition comprising a third-party identifier indicative of a corresponding one of the plurality of third-party computing systems, wherein the third-party identifier comprises a logo, and wherein identifying each one of the plurality of third-party computing systems comprises:

using optical character recognition to convert the logo to machine-readable text; and
matching the machine-readable text to one of a plurality of API identifiers corresponding to the asset-specific API call.

17. The computing system of claim 13, wherein the executable code further causes the computing system, when executed, to:
present, via the portal, a travel planner configured to be selectable using the input device to identify a set of travel actions to be taken with respect to a grouping of electronic assets, and a travel selection indicative of at least one of a location of travel or a date of travel, the grouping of electronic assets comprising at least one electronic asset from the set of electronic assets;
receive, via the portal, selection of the set of travel actions and the travel selection; and
executing, based on the selection, the set of API calls to implement the selection of the set of travel actions on the grouping of electronic assets.

18. A method, comprising:
presenting, by a processor of a computing device, a graphical user interface (GUI) on a display of the computing device, the computing device comprising an input device configured to detect at least one of alphanumeric entries, icon selections, or image data;
receiving, by the processor from the input device of the computing device, a plurality of asset definitions for a set of electronic assets, each asset definition comprising a third-party identifier that is indicative of a respective one of a plurality of third-party computing systems;
presenting, by the processor via the GUI, a virtual icon configured to be selectable using the input device to identify a coordinated action with respect to all electronic assets in the set of electronic assets;
detecting, by the processor, via the input device, a selection of the virtual icon from the input device; and
transmitting, based on the selection, by the processor via a transceiver of the computing device, an indication of the selection to a remote computing system to implement the coordinated action on all electronic assets in the set of electronic assets.

19. The method of claim 18, wherein the GUI comprises a scan tool, and wherein receiving the asset definition for at least one electronic asset of the set of electronic assets comprises:
capturing, via the input device, using the scan tool, image data of the electronic asset; and
analyzing the image data to identify the third-party identifier.

20. The method of claim 18, wherein the third-party identifier comprises a logo, and wherein the method further comprises identifying, via the processor, the plurality of third-party computing systems based on the plurality of third-party identifiers by:
using optical character recognition to convert the logo to machine-readable text;
matching the machine-readable text to an API identifier of a plurality of API identifiers corresponding to one of the plurality of third-party computing systems; and
transmitting, via the transceiver, the API identifier to the remote computing system.

* * * * *